United States Patent

Hattori et al.

[11] Patent Number: 5,515,330
[45] Date of Patent: May 7, 1996

[54] FIFO MEMORY DEVICE CAPABLE OF WRITING CONTIGUOUS DATA INTO ROWS

[75] Inventors: Hiroshi Hattori; Junich Sugiyama, both of Kawasaki, Japan

[73] Assignee: Fujitsu Limited, Kawasaki, Japan

[21] Appl. No.: 391,657

[22] Filed: Feb. 21, 1995

Related U.S. Application Data

[62] Division of Ser. No. 31,121, Mar. 12, 1993, Pat. No. 5,412,611.

[30] Foreign Application Priority Data

| Mar. 17, 1992 | [JP] | Japan | 4-060113 |
| Oct. 15, 1992 | [JP] | Japan | 4-277434 |
| Oct. 16, 1992 | [JP] | Japan | 4-278664 |

[51] Int. Cl.$^6$ .................................................. G11C 8/00
[52] U.S. Cl. .......................... 365/221; 365/219; 365/236; 365/239
[58] Field of Search .................................. 365/221, 219, 365/236, 239, 241

[56] References Cited

U.S. PATENT DOCUMENTS

| 3,648,247 | 3/1972 | Guzak, Jr. | 340/172.5 |
| 4,864,543 | 9/1989 | Ward et al. | 365/221 |
| 5,121,480 | 6/1992 | Bonke et al. | 395/250 |

FOREIGN PATENT DOCUMENTS

| 0260897 | 3/1988 | European Pat. Off. . |
| 0276870 | 8/1988 | European Pat. Off. . |
| 0299264A2 | 1/1989 | European Pat. Off. . |
| 0353942A2 | 2/1990 | European Pat. Off. . |
| 0509722A2 | 10/1992 | European Pat. Off. . |
| 2009984 | 6/1979 | United Kingdom . |
| 1591054 | 6/1981 | United Kingdom . |
| 2245729 | 1/1992 | United Kingdom . |

*Primary Examiner*—David C. Nelms
*Assistant Examiner*—Andrew Q. Tran
*Attorney, Agent, or Firm*—Armstrong, Westerman, Hattori, McLeland & Naughton

[57] ABSTRACT

A FIFO memory device includes a storage device and an address translator. The storage device contains a plurality of FIFO storage unit cells connected in parallel, wherein data is input to and output from each of the FIFO storage unit cells one word at a time, and data is input to the storage device one word at a time and output from the storage device in units of a plurality of words. The address translator is disposed between a central processing unit and an input side of the storage device for translating an address specified by the central processing unit into an address specifying one of the storage unit cells of the storage device. The address translator includes a count enable signal output element responsive to addressing from the central processing unit for outputting a count enable signal, a counter responsive to the count enable signal from the count enable signal output element for counting up, and a selector responsive to a count value of the counter for selecting one of the storage unit cells.

3 Claims, 25 Drawing Sheets

| MEMORY CELL NO. | WRITE POINTER SPECIFICATION VALUES | | | | | | |
| --- | --- | --- | --- | --- | --- | --- | --- |
| | 1 | 2 | 3 | 4 | --- | m-p | m-p+1 |
| 1 | 1 | X | X | X | --- | X | X |
| 2 | 2 | 1 | X | X | --- | X | X |
| 3 | 3 | 2 | 1 | X | --- | X | X |
| 4 | 4 | 3 | 2 | 1 | --- | X | X |
| ⋮ | ⋮ | ⋮ | ⋮ | ⋮ | | ⋮ | ⋮ |
| m-1 | X | X | X | X | --- | p | p-1 |
| m | X | X | X | X | --- | X | p |

FIG. 19

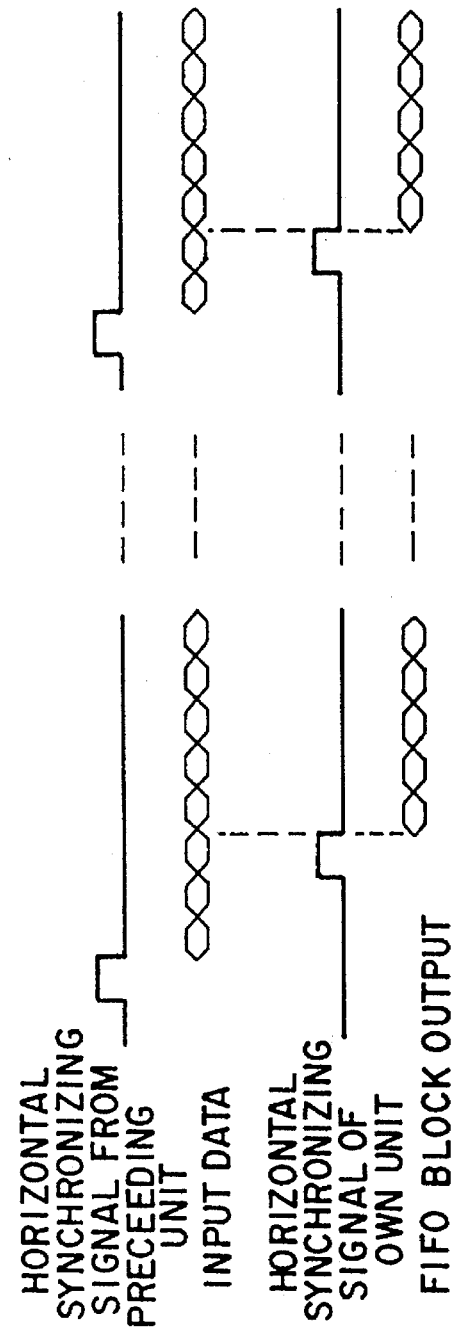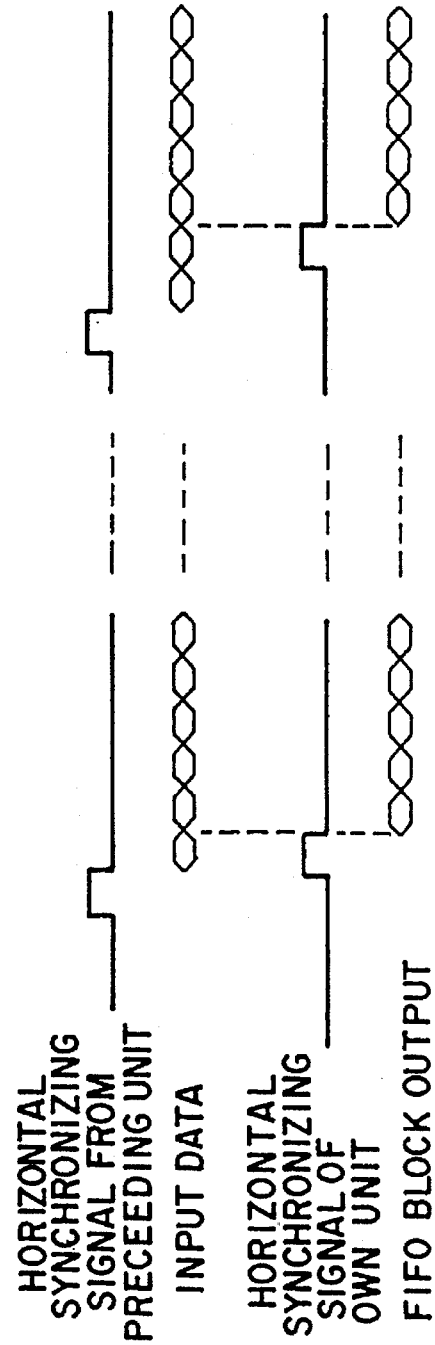

FIFO MEMORY DEVICE CAPABLE OF WRITING CONTIGUOUS DATA INTO ROWS

This is a division of application Ser. No. 08/031,121 filed Mar. 12, 1993, now U.S. Pat. No. 5,412,611.

BACKGROUND OF THE INVENTION

1. Field of the Invention

This invention relates to an FIFO (first-in first-out) memory device and an application device thereof, and more particularly to an FIFO memory device used for a distribution circuit, synthesizing circuit, etc., of image data for parallel processing to speed up graphics processing at a three-dimensional graphics display or the like.

2. Description of the Related Art

FIG. 1 shows a conventional FIFO memory device where fixed-length data is input one word at a time and one data item consisting of words is output in parallel at the same time. Assume that for example, the FIFO memory device comprises four normal FIFO memory cells 101–104, each of which one word (in this case, eight bits) is input to and output from. The entire FIFO memory device is designed to input data one word at a time and output four words (8×4 bits) in parallel.

To execute input operation to such an FIFO memory device, a host central processing unit 105 needs to recognize that four FIFO memory cells 101–104 exist, and address the four FIFO memory cells 101–104 in sequence to write data into the four cells 101–104 in sequence one word at a time.

For such a conventional FIFO memory device, the host central processing unit 105 must recognize the FIFO memory cells separately for addressing, thus perform complicated write control. On the other hand, to speed up graphics processing at three-dimensional graphics displays, etc., demand is placed for relieving the host central processing unit 105 of its work load as much as possible.

A memory array consisting of memory cells arrayed like a matrix is used for a conventional FIFO memory device where variable-length data is input one word at a time and one data item consisting of words is output in parallel at the same time; input data is written, one word at a time, starting at the beginning of each row and on the other hand, the words in all columns within one row are read out at the same time.

To read out data in such a manner, two data items are prevented from being written into one row of the memory array. That is, if data write terminates at an intermediate point of one row of the memory array, dummy data is written into the remaining columns of the row.

FIG. 2 illustrates the dummy data write.

Assume that input data 106 has, for example, the entire length of seven words, namely, consists of 1-word command data and 6-word parameter data, as shown in FIG. 2(*a*), and that a memory array 107 consists of three rows×six columns of memory cells, as shown in (*b*) and (*c*).

In FIG. 2, to write the input data 106 into the memory array 107 one word at a time, parameter data 6 of the seventh word of the input data 106 is written into a memory cell on the next row as shown in (b). If the next input data is written into the memory cell contiguous to the memory cell where the parameter data 6 is written, output data contains the two separate data items when all columns of the row are read out at a time (see arrows in the figure).

To avoid this problem, dummy data is written into the remaining columns and the next data is written into the next row, as shown in (c).

However, address control to accomplish data write in this manner becomes complicated and consumes considerable time; this is an obstacle to speeding up graphics processing at a three-dimensional graphics display, etc..

For data read out for each row from the memory array 107, the number of bytes of one data item is unknown. Thus, when variable-length data read out is disassembled into words, dummy data other than the original words making up data is also handled as words.

To speed up graphics processing, some three-dimensional graphics display is provided with three-dimensional frame memories (3D-FMs) 110–113, as shown in FIG. 3; partial image data pieces generated by image processing blocks (not shown), which are different from each other, are written into the 3D-FMs and then the image data pieces written into the 3D-FMs 110–113 are synthesized by image synthesizing blocks 114–116.

Each of the image synthesizing blocks 114–116 synthesizes the image data written into the 3D-FM in its own unit with the image data transferred from the unit at the preceding stage (in FIG. 3, the unit to the left of its own unit). A display block 117 displays the final image data synthesized. Unit 0 generates basic image data and units 1 to n are added in sequence according to the necessity of high speed processing and the complexity of images.

The image synthesizing blocks 114–116 of the three-dimensional graphics display must synchronize with each other when synthesizing image data from the preceding unit with image data from the 3D-FM of its own unit. Thus, each of the image synthesizing blocks 114–116 is provided with a register for giving a given amount of delay to the input timing of the image data from the preceding unit to absorb synchronization shift caused by clock shift or a delay at image data transfer in each unit.

However, the conventional method contains a disadvantage in that synchronization shift caused by a temperature change or parts variation cannot precisely be adjusted because the synchronization adjustment amount (delay amount in each register) is constant. Since the three-dimensional graphics display is made up of a large number of units which are connected, as shown in FIG. 3, it is necessary to set the synchronization amount for each connection and also to make the registers in the units separately.

SUMMARY OF THE INVENTION

It is a first object of the invention to provide an FIFO memory device for simplifying write control of a host central processing unit at the write side to relieve the host CPU of its work lead.

It is a second object of the invention to provide an FIFO memory device where variable-length data can be written into each memory cell one word at a time without writing dummy data and can be read out for each data item at the same time and the read-out variable-length data can be disassembled into words correctly.

It is a third object of the invention to provide an FIFO synchronizing device which always enables fine adjustment of synchronization when synchronization shift is caused by a temperature change or parts variation, and which eliminates the need for synchronization adjustment at each connection even when a large number of units are connected to build a system.

To the first end, according to one embodiment of the invention, there is provided an FIFO memory device which comprises storage means containing a plurality of FIFO storage unit cells connected in parallel, each of which data is input to and output from one word a time, wherein data is input one word at a time and output in units of a plurality of words. The FIFO memory device further includes:

address translation means being disposed between a central processing unit at an input side and the storage means for translating an address specified by the central processing unit into an address specifying one of the storage unit cells of the storage means.

Also, there is provided an FIFO memory device which comprises FIFO storage means where FIFO storage unit cells, each of which data is input to and output from one word at a time, are located like a matrix wherein each of the storage unit cells can be specified by a two-dimensional coordinate address. The FIFO memory device further includes:

write cell specification means for specifying a storage unit cell in the storage means by a two-dimensional coordinate address so as to consecutively write a fixed-length data item consisting of a predetermined number of words input in sequence into a row of the storage means; and read cell specification means for selecting a read row in write order among rows of the storage means where data is written to read all words stored on the selected row.

Instead of the read cell specification means, the FIFO memory device further includes read cell specification means for selecting a row into which data is first written among rows of the storage means where data is written to read all words stored on the selected row and row shift means, after read of all the words stored on the row where data is first written, as specified by the read cell specification means, for shifting all words stored on each row in the storage means to an adjacent row where data is written earlier.

To the second end, according to another embodiment of the invention, there is provided an FIFO memory device which comprises FIFO storage means where FIFO storage unit cells, each of which variable-length data containing count information of words making up the data is input to and output from one word at a time, are located like a matrix wherein each of the storage unit cells can be specified by a two-dimensional coordinate address. The FIFO memory device further includes:

word count detection means for detecting the word count stored in input data;

write cell specification means for specifying a storage unit cell in said storage means by a two-dimensional coordinate data so as to write words of said input data into said storage ,leans from the beginning of a row thereof along the row and to sopt writing words of said input data when the number of the written words reaches said word count detected by said word count detection means; and read cell specification means for specifying a storage unit cell in the storage means by a two-dimensional coordinate address to read out data written into the storage means for each row in a first-in first-out manner.

Also, there is provided an FIFO memory device which comprises FIFO storage means where FIFO storage unit cells, each of which variable-length data containing count information of words making up the data is input to and output from one word at a time, are located as a one-dimensional array. The FIFO memory device further includes:

word count detection means for detecting the word count stored in input data;

row specification means responsive to a word count of previous input data detected by the word count detection means for specifying a row of the storage means into which a first word of current input data is to be written;

write means for writing the current input data in batch in a predetermined direction along column starting at the row specified by the row specification means;

read means for reading a word written into a row positioned at the column end at an opposite direction to the predetermined direction in the storage means; and row shift means for shifting each word stored on each row in the storage means to an adjacent row in an opposite direction to the predetermined direction after the read means executes the read.

To the third end, according to a further embodiment of the invention, there is provided an FIFO synchronizing device for adjusting timing of data input from a unit at a preceding stage. The FIFO synchronizing device comprises:

FIFO memory means where data input from the preceding unit is written and then read out in the write order;

write timing instruction means being responsive to a synchronizing signal from the preceding unit for instructing data write timing to the memory means;

read timing instruction means being responsive to a synchronizing signal of its own unit for instructing data read timing to the memory means; and synchronizing signal output means for outputting a synchronizing signal of its own unit adjusted so that the difference between the data write timing from the write timing instruction means and the data read timing from the read timing instruction means becomes constant to the preceding unit as a synchronizing signal of the preceding unit.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

In the accompanying drawings:

FIG. 19 is a drawing illustrating write pointer specification values when n-word input data is written into a memory array consisting of m memory cells;

FIG. 25(a) is a timing chart for illustrating the operation of delay adjustment circuit when the data input timing leads; and FIG. 25(b) is a timing chart for illustrating the operation of delay adjustment circuit when the data input timing lags behind.

DESCRIPTION OF THE PREFERRED EMBODIMENTS

Referring now to the accompanying drawings, there are shown embodiments of the invention.

Figure 4:
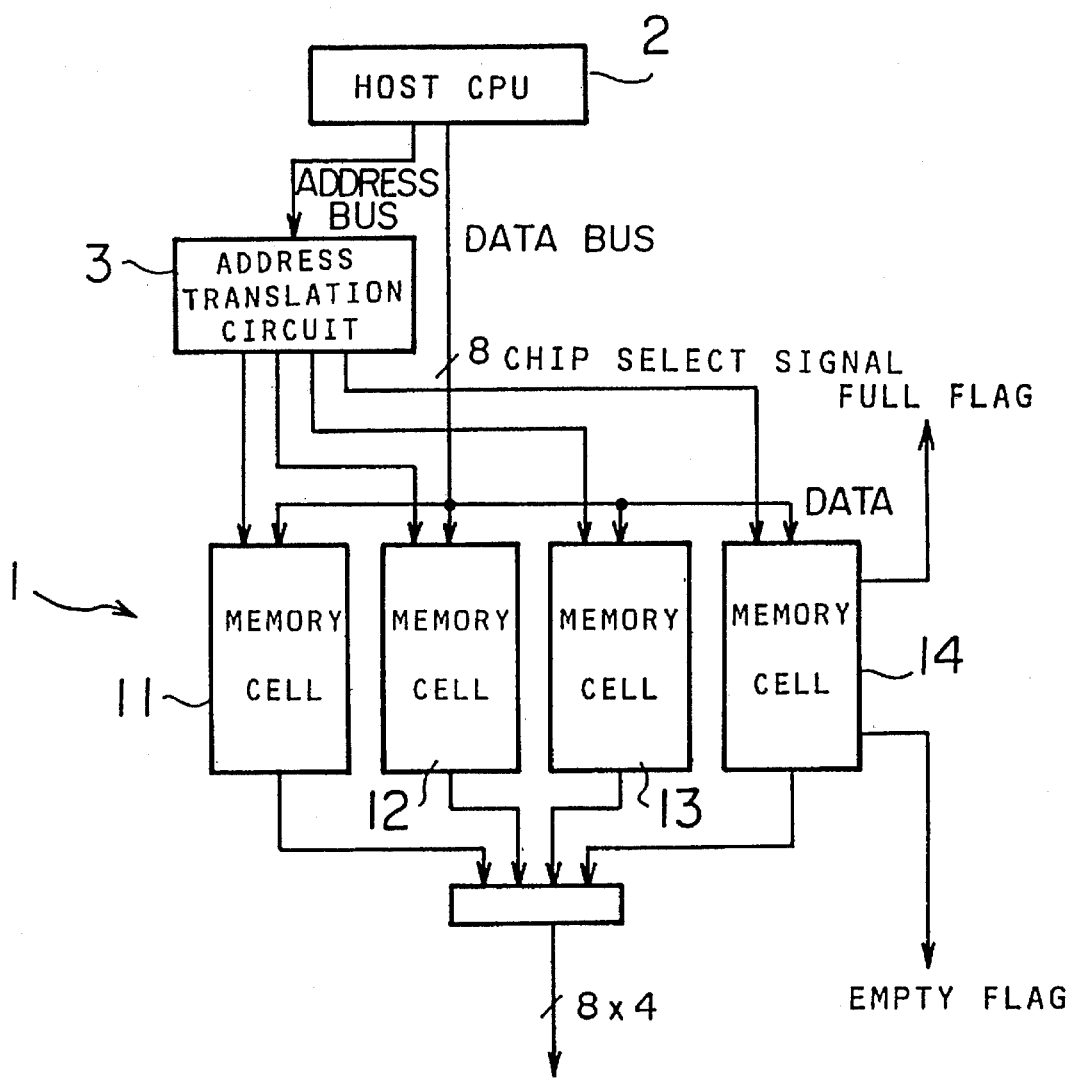
FIG. 4 is a block diagram showing the schematic configuration of a first embodiment of the invention for reading fixed-length data one word at a time and outputting one data item of words at the same time.

FIG. 4 is a block diagram showing the schematic configuration of a first embodiment of the invention for reading fixed-length data one word at a time and outputting one data item of words at the same time. A memory array 1 consists of four general purpose FIFO memory cells 11, 12, 13, and 14, to and from each of which data is input and output one word at a time. The memory cells 11 to 14 are connected to a host central processing unit 2 via an address translation circuit 3 and to an 8-bit data bus from the host CPU 2. On the other hand, outputs of the memory cells 11–14 are combined into one for outputting to a 32-bit data bus at a time.

A monitor device (not shown) monitors the write and read state of the memory cell 14 where data is written and read last among the four memory cells. When none of the words fully written into the memory cell 14 are read, the monitor outputs a full flag signal to disable write into the memory array 1; when all the words written into the memory cell 14 are read, the monitor outputs an empty flag signal to disable read from the memory cell 14.

Figure 5:
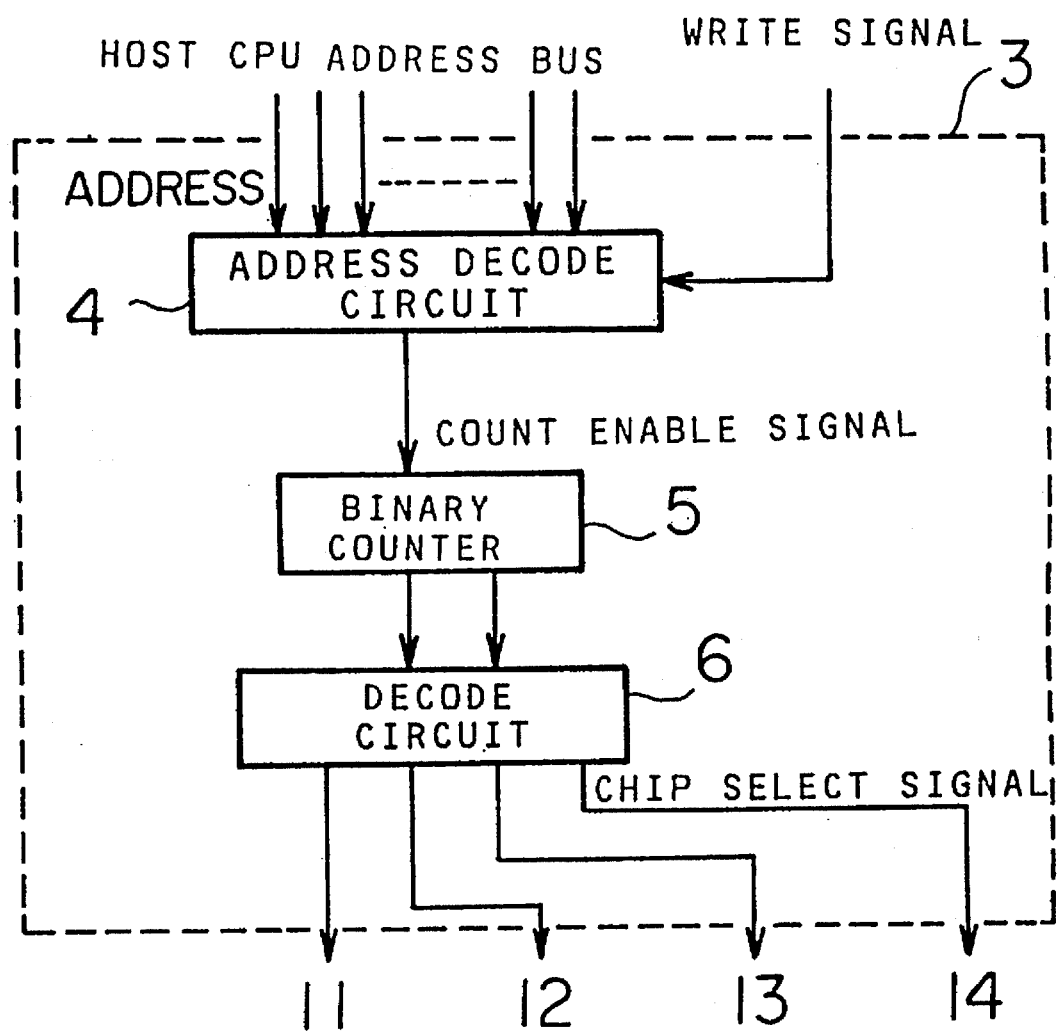
FIG. 5 is a block diagram showing the internal configuration of an address translation circuit.

FIG. 5 is a block diagram showing the internal configuration of the address translation circuit 3. An address decoder circuit 4 is connected to the address bus of the host CPU 2 and receives write addressing from the host CPU 2. The host CPU 2 specifies a write address in the format independent of the configuration of the memory array 1, namely, the number of installed memory cells, etc. When a write address related to the memory array 1 is specified and a write signal for instructing a write is input from the host CPU 2, the address decode circuit 4 outputs a count enable signal to a binary counter 5 which is a 2-digit binary counter counting up each time a count enable signal is input, that is, outputs count values "00", "01", "10", "11", "00" . . . . When receiving the count value of the binary counter 5, the decode circuit 6 outputs a chip select signal to the memory cell corresponding to the count value. A word is written from the host CPU 2 through the data bus into the memory cell among the memory cells 11–14 receiving the chip select signal.

Figure 6:
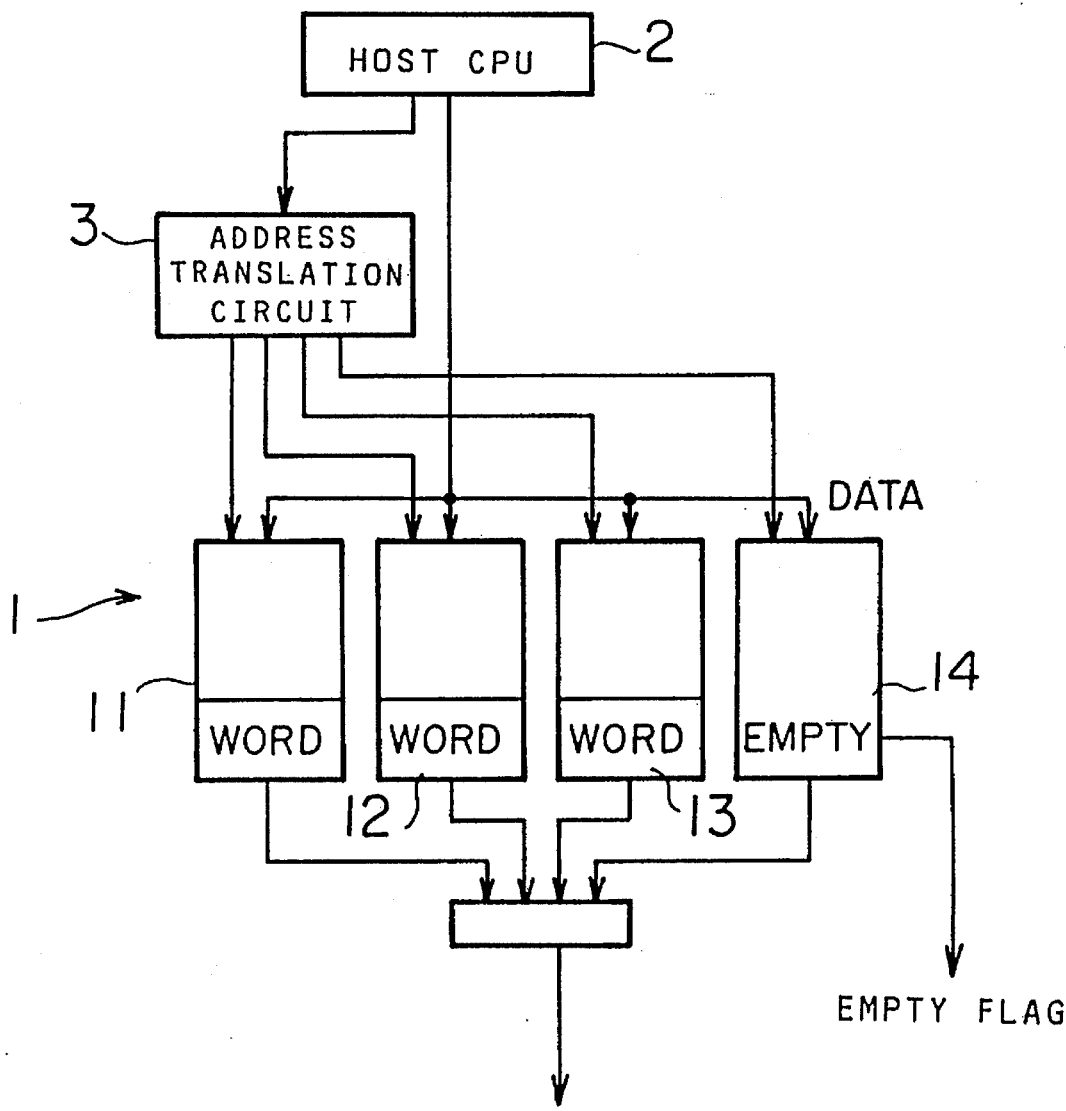
FIG. 6 is an illustration of the relationship between full and empty signal output and memory array state.
Figure 7:
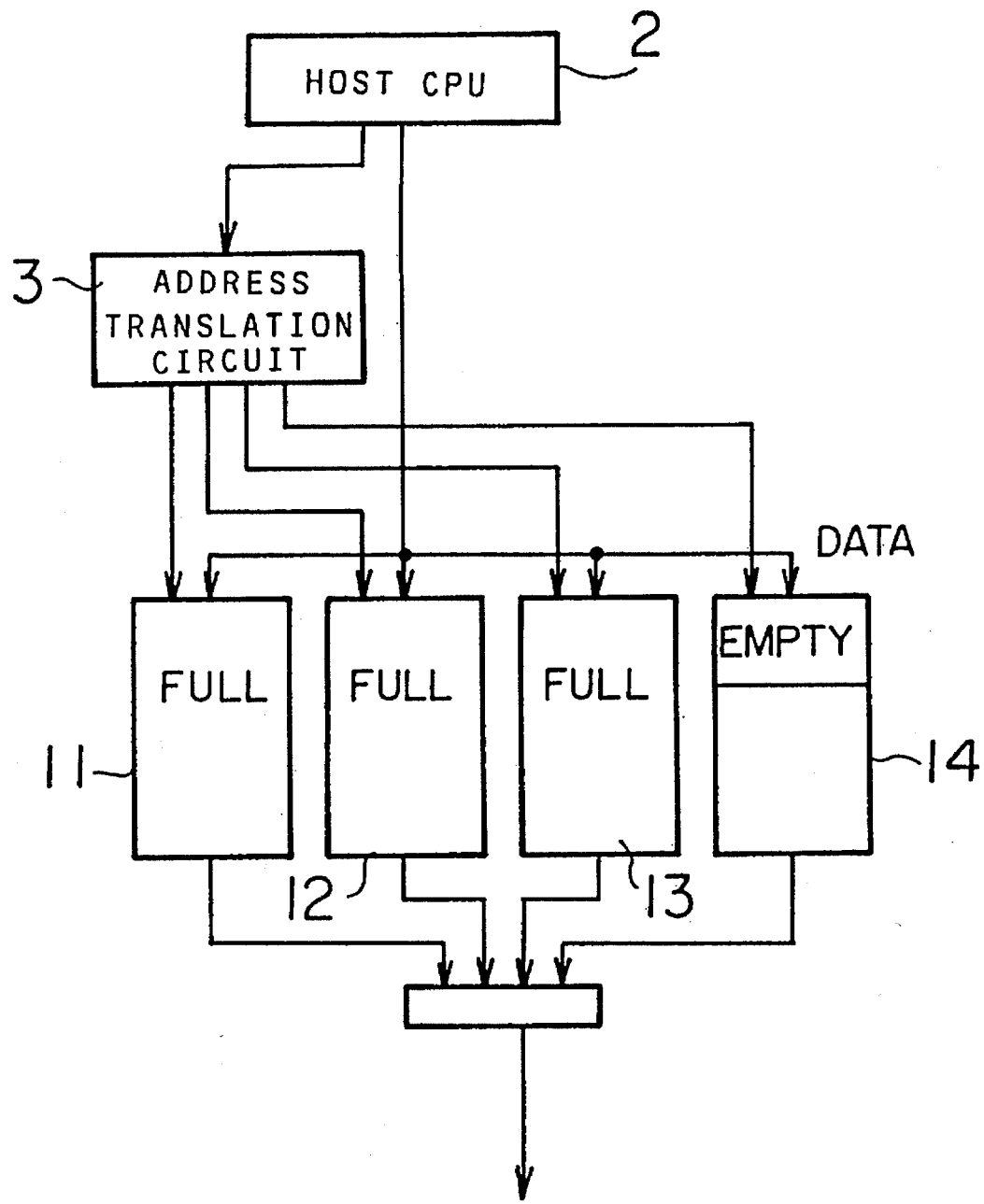
FIG. 7 is an illustration of the relationship between full and empty signal output and memory array state.

FIGS. 6 and 7 are drawings illustrating the relationship between full and empty signal output and the state of the memory array 1. In FIG. 6, when all words written into the memory cell 14 are read, even if other memory cells 11–13 contain data not yet read, an empty flag is output. On the other hand, in FIG. 7, when none of the words written into the memory cell 14 are read, a full flag signal is output; when one or more words are read from the memory cell 14, even if none of the words written into other memory cells 11–13 are read, output of a full flag signal is suppressed.

Returning to FIG. 4, when data is output from the memory array 1, words are read out onto the data bus at a time from the four memory cells 11–14.

According to the first embodiment of the invention, when data is written into the memory array the host CPU 2 needs only to specify a write address in the format independent of the internal configuration of the memory array 1 by providing the address translation circuit 3. Simply by specifying write addresses, data can be written into the memory cells 11–14 in sequence for simplifying write control of the host CPU 2. Therefore, the host CPU 2 can be relieved from conventional complicated write control and use the capabilities for contributing to speeding up graphics processing at a three-dimensional graphics display, etc.

Next, there is shown a second embodiment of the invention for reading fixed-length data one word at a time and outputting one data item of words at the same time. Assume that the fixed-length data consists of n words.

Figure 8:
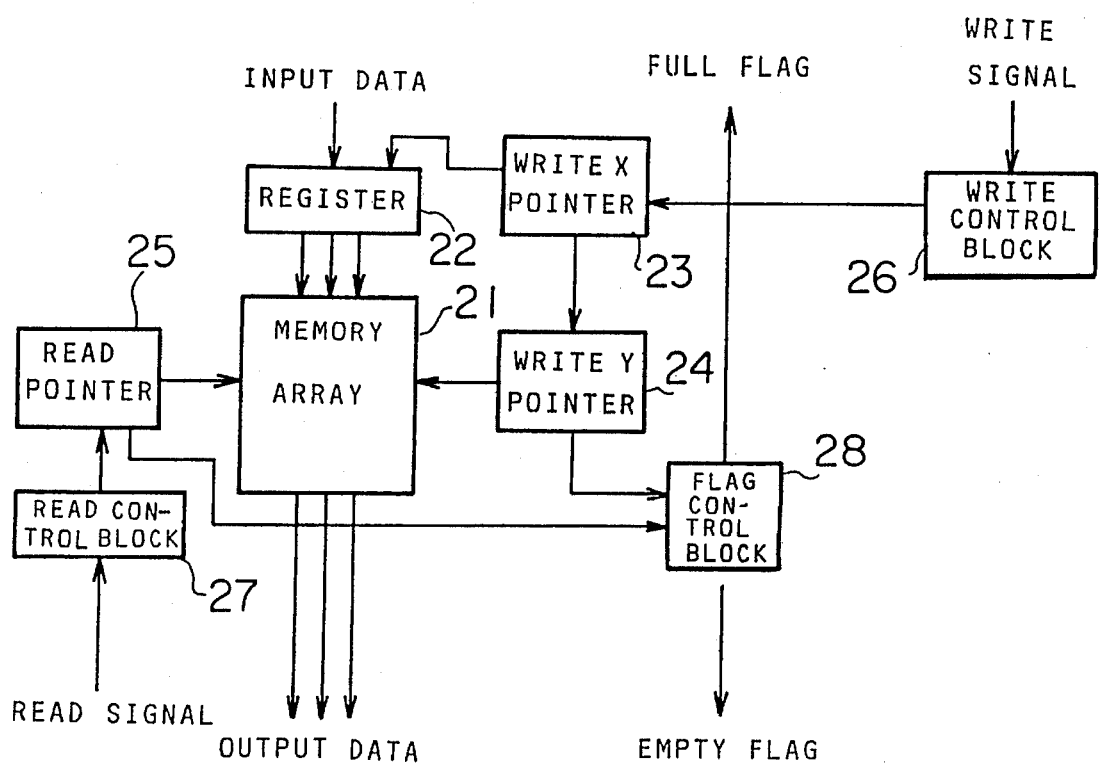
FIG. 8 is a block diagram showing the entire configuration of a second embodiment of the invention.

FIG. 8 is a block diagram showing the entire configuration of the second embodiment of the invention.

In the embodiment, a memory array 21 is an array of N rows×n columns of FIFO memory cells, each for inputting/outputting one word. A register 22 is a register which can retain n×m bits when one word consists of m bits, and is connected to the input side of the memory array 21 by connection lines for n×m bits. A write X pointer 23 points to the bit position of the register 22 into which each word of data input to the register 22 is to be written in sequence. A write Y pointer 24 points to the row position of the memory array 21 into which data is to be written. A read pointer 25 points to the row position of the memory array 21 from which data is to be read. A write control block 26 is responsive to a write signal which is a write instruction from a host CPU for controlling the operation of the write X and Y pointers 23 and 24. A read control block 27 is responsive to a read signal which is a read instruction from a slave CPU for controlling the operation of the read pointer 25. A flag control block 28 outputs a full flag and an empty flag in response to output signals from the write Y pointer 24 and the read pointer 25.

In operation, data input from the host CPU to the register 22 one word at a time is stored in the register 22 in sequence as pointed to by the write X pointer 23. When one data item of n words is stored in the register 22, the n-word data item is then shifted from the register 22 to a row of the memory array 21 as pointed to by the write Y pointer 24.

On the other hand, to read data from the memory array 21, first a read signal is output to the read pointer 25 and the read pointer 25 points to the row position where the first written data is stored for reading out the n-word data stored on the row at a time.

When the memory array 21 becomes full and new data cannot be written, a full flag is output from the flag control block 28; when the memory array 21 becomes empty and data cannot be read out, an empty flag is output from the flag control block 28.

In addition to simple write control of the host CPU as with the first embodiment, the second embodiment provides the circuit configuration that can be easily put into LSI with gate arrays.

Next, there is shown a third embodiment of the invention for reading fixed-length data one word at a time and outputting one data item of words at the same time. Assume that the fixed-length data consists of (m+1) words.

Figure 9:
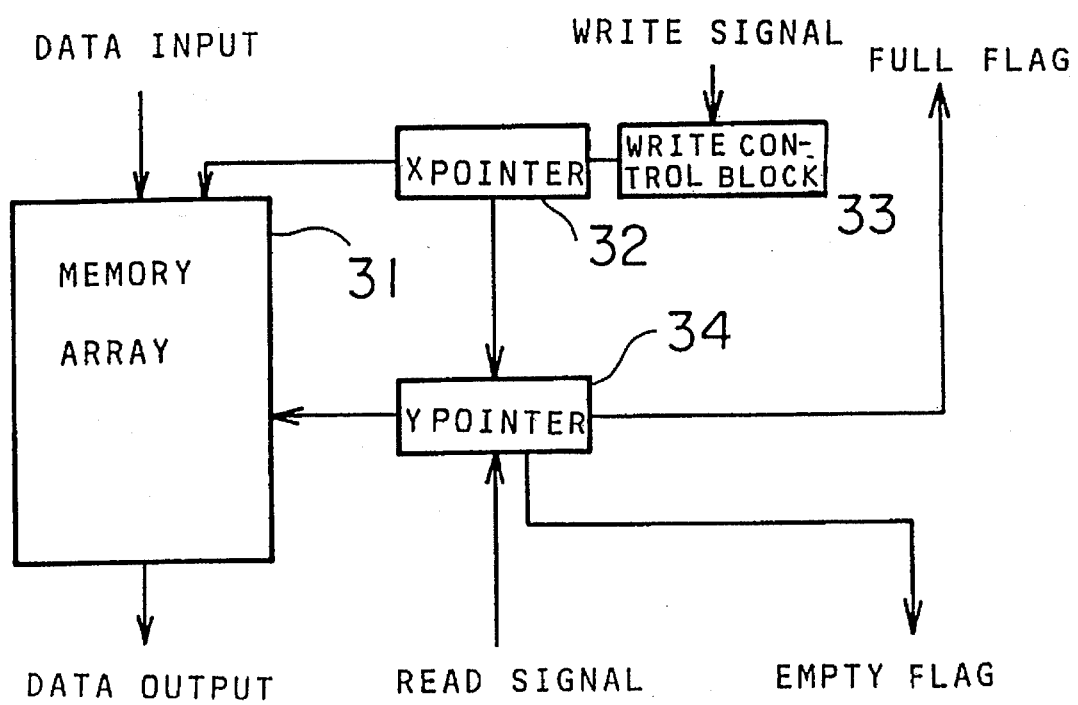
FIG. 9 is a block diagram showing the entire configuration of a third embodiment of the invention.

FIG. 9 is a block diagram showing the entire configuration of the third embodiment of the invention. FIG. 10 is a drawing showing the detailed configuration of the memory array shown in FIG. 9.

A memory array 31 consists of (k+1) rows×(m+1) columns of memory cells to which an X pointer 32 for pointing to a write column address, a Y pointer 34 for pointing to a write row address, and a write control block 33 are connected. The X pointer 32 points to a column address for each row of the memory array 31 from O to m in sequence. When the X pointer 32 points to column address m, the Y pointer 34 counts up; each time data is read out from the memory array 31, the Y pointer 34 counts down. The write control block 33 is responsive to a write signal which is a write instruction from a host CPU for controlling the operation of the X pointer 32 and Y pointer 34.

In the embodiment, an empty or full flag is output in response to the row address pointed to by the Y pointer 34: When the Y pointer 34 points to row address an empty flag is output; when the Y pointer 34 points to row address (k+1), a full flag is output.

Figures 10A, 10B:
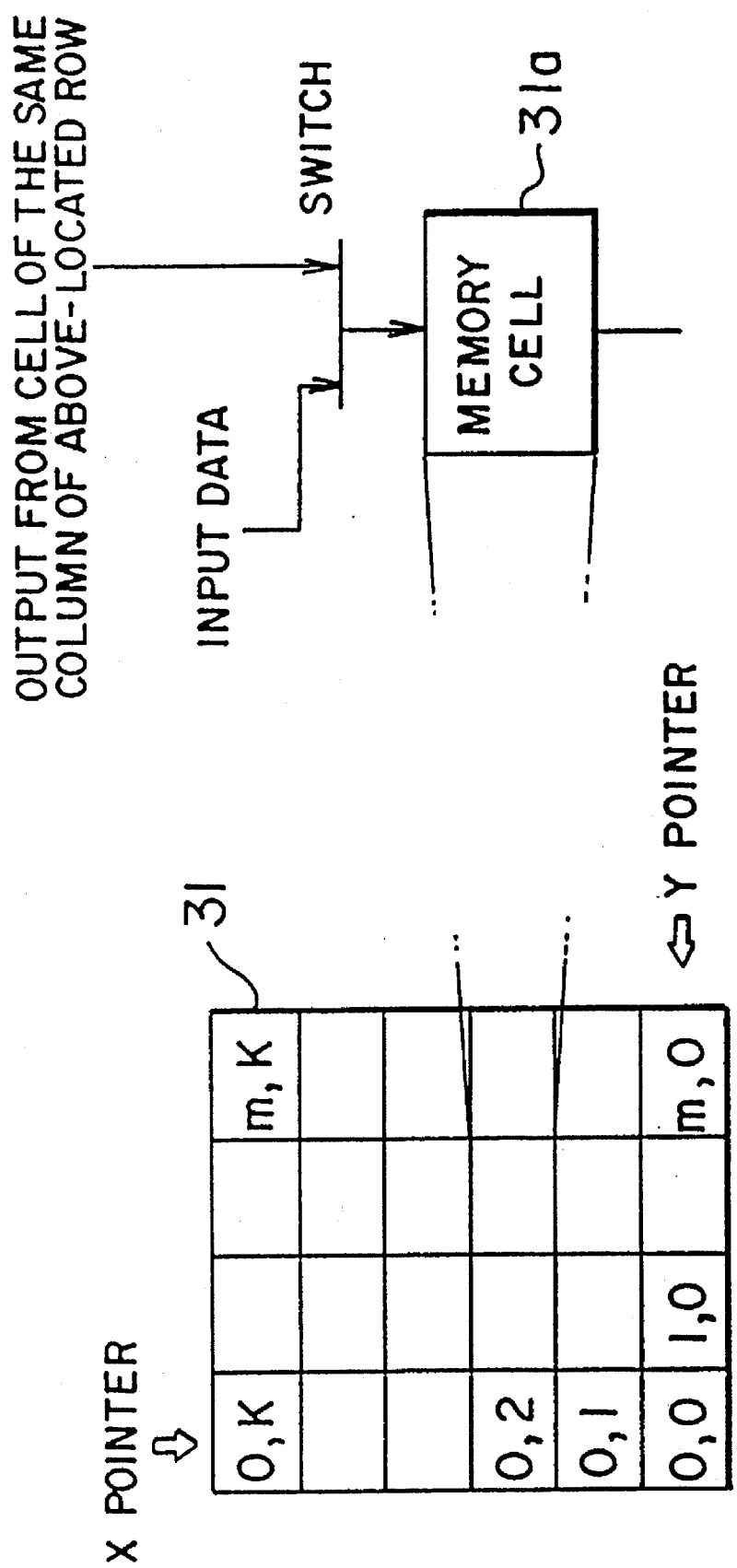
FIGS. 10(a) and 10(b) are drawings showing the detailed configuration of the memory array shown in FIG. 9.

When a read signal (read instruction) is input to the Y pointer 34, data read in the memory array 31 is started at the bottom row of the memory array 31 in FIG. 10, namely, the memory cells at row address O. After the read terminates, each memory cell copies into its own cell the store contents of the memory cell of the same column of the just-above located row. As illustrated in FIGS. 10(a) and 10(b) a memory cell 31a has two input terminals. When the memory cell is pointed to by the X pointer 32 and the Y pointer 34, input data from the host CPU is written through one input terminal; when a read is executed when the memory cell is not specified by the X pointer 32 or the Y pointer 34, the store contents of the memory cell of the same column of the row just above that memory cell are copied through the other input terminal.

In operations, fixed-length data consisting of (m+1) words input from the host CPU one word at a time is input to the row pointed by the Y pointer 34 in sequence starting at column address O as pointed to by the X pointer 32. When the column address pointed to by the X pointer 32 reaches m, the row address pointed to by the Y pointer is incremented by one. On other hand, when a read signal is input, one data item of (m+1) words is read out at a time from the bottom row of the memory array 31 (row address O).

Just after the read, the row address pointed to by the Y pointer 34 is decremented by one and the words stored in the memory cells of the memory array 31 are shifted one row downward. The words stored in the memory at row address 1 are stored in the memory cells at row address O and likewise, the words in the memory cells at row address (i+1) are stored in the memory cells at row address (i).

Thus, just after the read, the row address pointed to by the Y pointer 34 is decremented by one and the words stored in the memory cells of the memory array 31 are shifted one row downward, so that a read is always started at the bottom row of the memory array 31. Therefore, in addition to simple write control of the host CPU as with the first embodiment, the third embodiment provides simpler read control and eliminates the need for a read pointer as compared with the first and second embodiments.

Next, there is shown a fourth embodiment of the invention for reading variable-length data one word at a time and outputting one data item of words at the same time.

Figure 11:
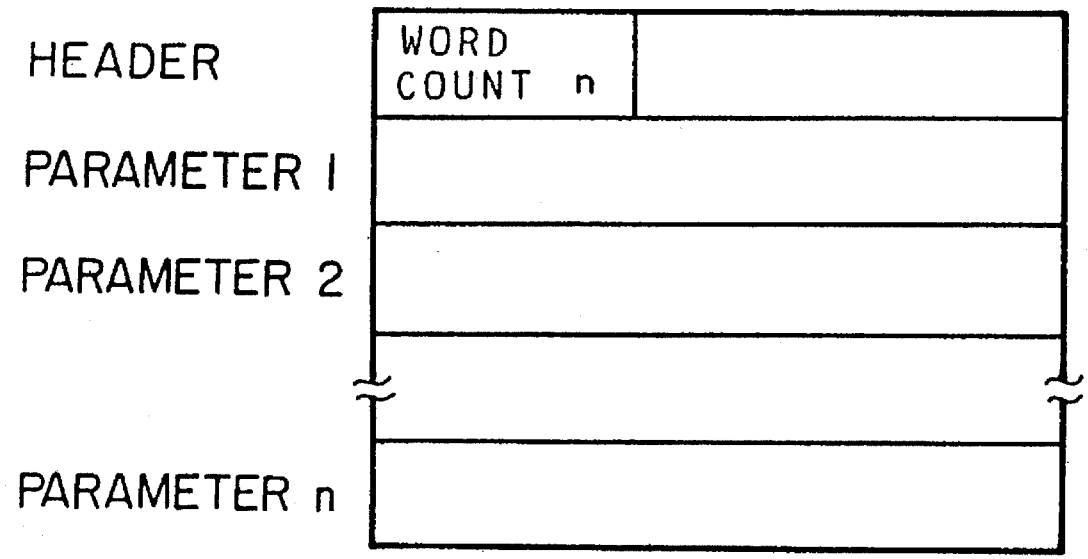
FIG. 11 is a drawing showing the format of variable-length data.

First, the format of variable-length data used with the fourth embodiment is described with reference to FIG. 11. FIG. 11 shows one data item consisting of a header and variable-length parameter data. Each stage of the figure is one word. The header contains the total number of words of the following parameter data. In FIG. 11, n is stored in the header.

Figure 12:
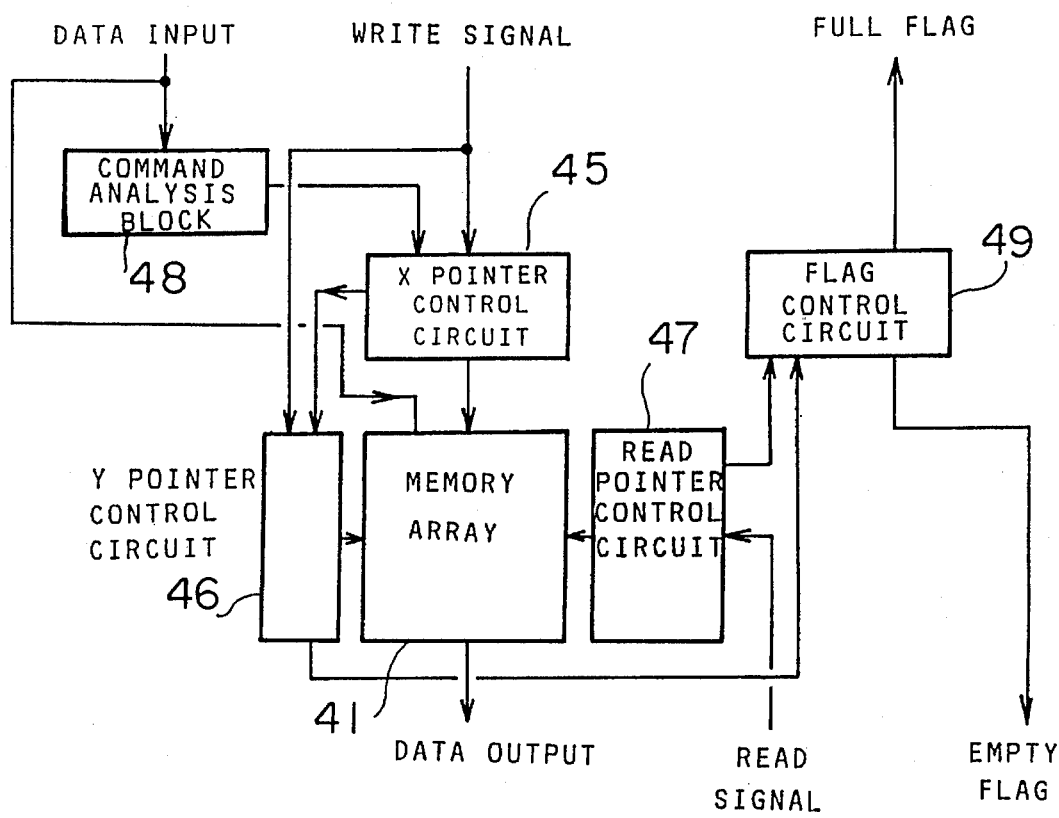
FIG. 12 is a block diagram showing the entire configuration of a fourth embodiment of the invention.

FIG. 12 is a block diagram showing the entire configuration of the fourth embodiment.

Variable-length data in the format shown in FIG. 11 is input to a command analysis block 48 and a memory array 41. The command analysis block 48 detects word count n stored in the header of the input data and outputs the detected word count n to an X pointer control circuit 45.

Figure 13:
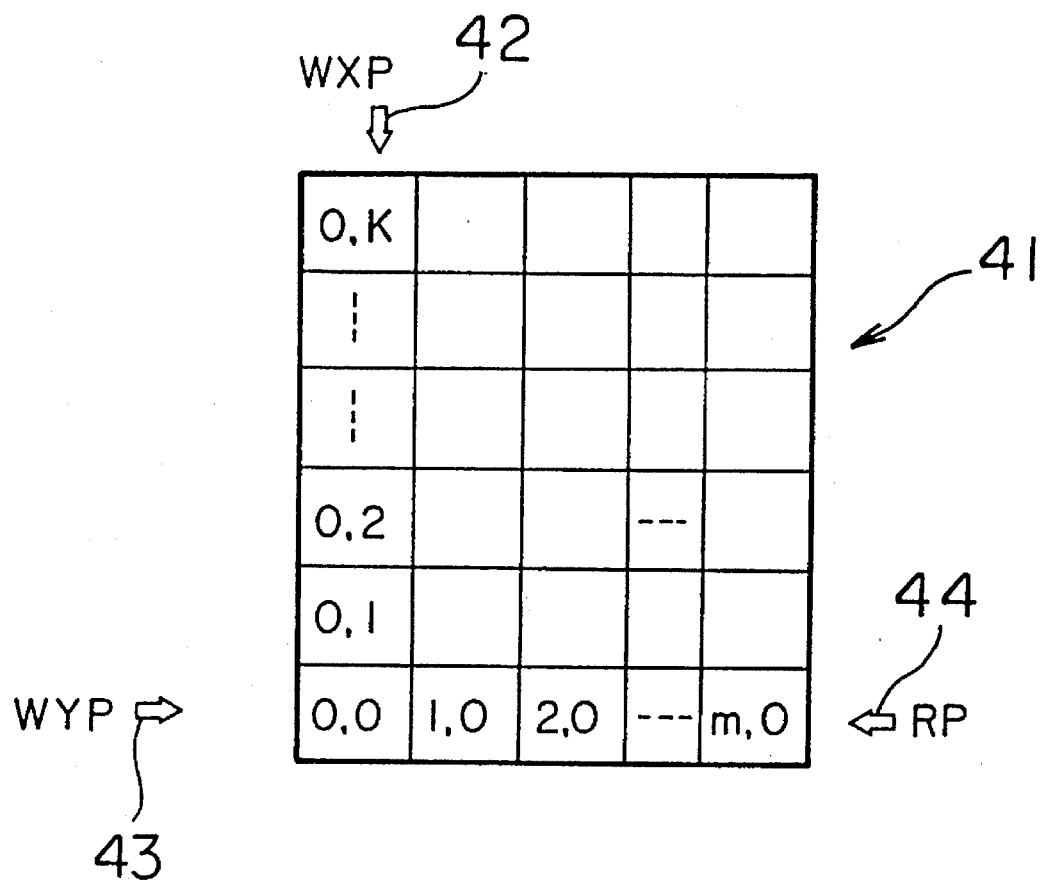
FIG. 13 is a drawing showing arrangement of memory cells in a memory array.

As shown in FIG. 13, the memory array 41 consists of (k+1) rows×(m+1) columns of memory cells, each for inputting/outputting data one word at a time. The memory cell into which data is to be written is pointed to by a write X pointer (WXP) 42 and a write Y pointer (WYP) 43 as two-dimensional addressing.

On the other hand, the memory cell from which data is to be read out is pointed to by a read pointer (RP) 44 specifying only a At read operation, (m+1) words on the row pointed to by the read pointer 44 are read out at the same time.

Each time a word is written, the write X pointer 42 is incremented by one from O to m. When the count reaches (m+1) which is the number of columns of the memory array 41 or when the last word of one variable-length data item is written, the write X pointer 42 is reset to 0, at which time the write Y pointer 43 is incremented by one.

Returning to FIG. 12, the X pointer control circuit 45 controls the count operation of the write pointer 42 and a Y pointer control circuit 46 controls the count operation of the write Y pointer 43. A read pointer control circuit 47 controls the count operation of the read pointer 44. The X pointer control circuit 45 monitors the count value of the write X pointer 42. When the count value reaches (m+1) or (n+1) where n is the word count of variable-length input data detected by the command analysis block 48, the X pointer control circuit 45 resets the count value of the write X pointer 42 to 0.

A flag control circuit 49 compares the count value of the write Y pointer 43 with that of the read pointer 44 to determine whether write and read are enabled or disabled. When write and read are disabled, the flag control circuit 49 outputs a full flag and an empty flag respectively.

In the fourth embodiment, the command analysis block 48 detects the word count of input variable-length data and the X pointer control circuit 45 is responsive to the detected word count for operating the write X pointer 42 for writing data. Therefore, dummy data write operation is not required and the control operation of the X pointer control circuit 45 is simple and can be performed at high speed, thereby speeding up graphics processing at three-dimensional graphics displays, etc.

Next, there is shown a fifth embodiment of the invention for writing variable-length data all words at a time and reading out one word at a time. Assume that the format of variable-length data used with the fifth embodiment is also as shown in FIG. 11.

Figure 14:
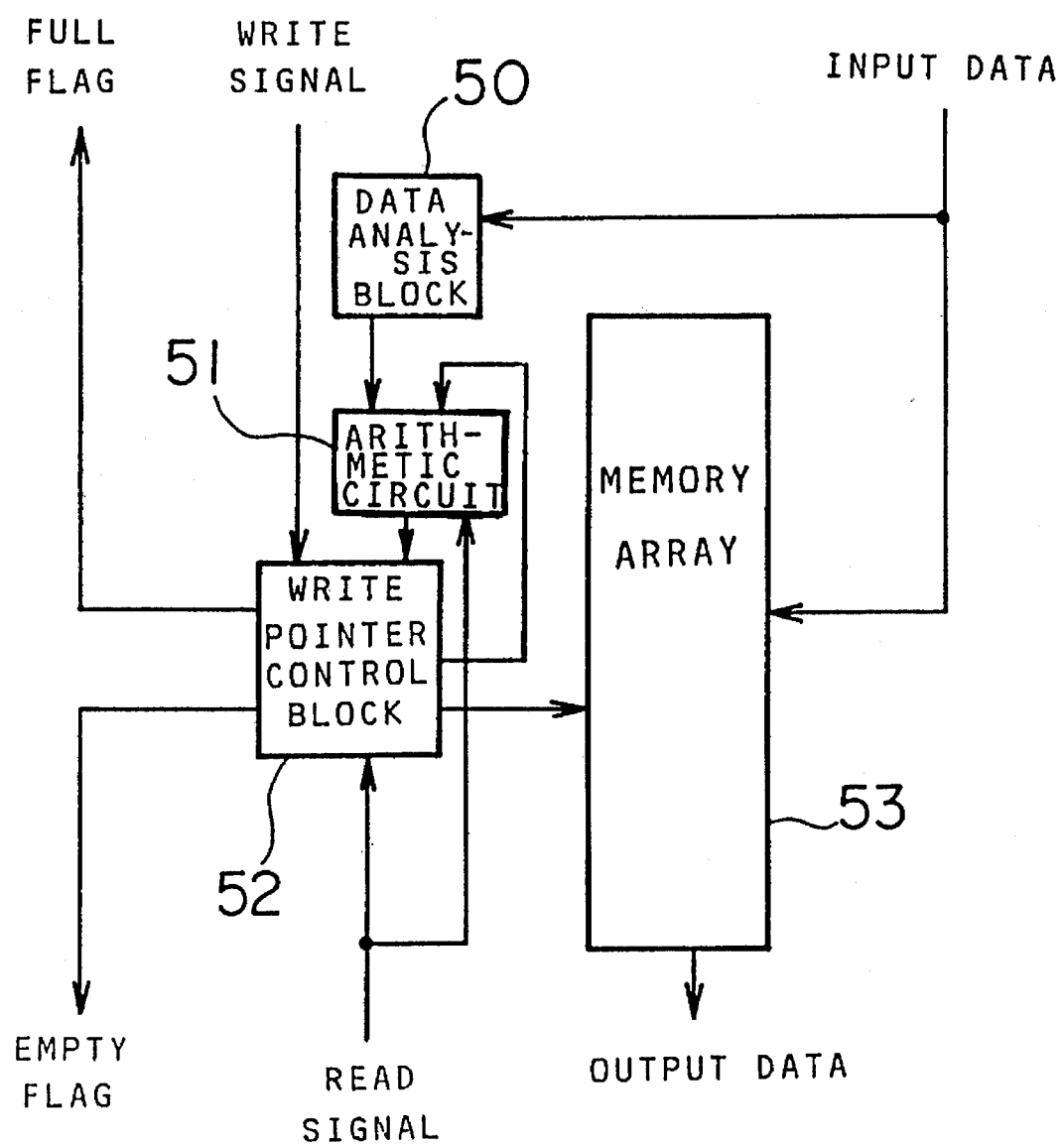
FIG. 14 is a block diagram showing the entire configuration of fifth embodiment of the invention.

FIG. 14 is a block diagram showing the entire configuration of the fifth embodiment.

Figure 15A:
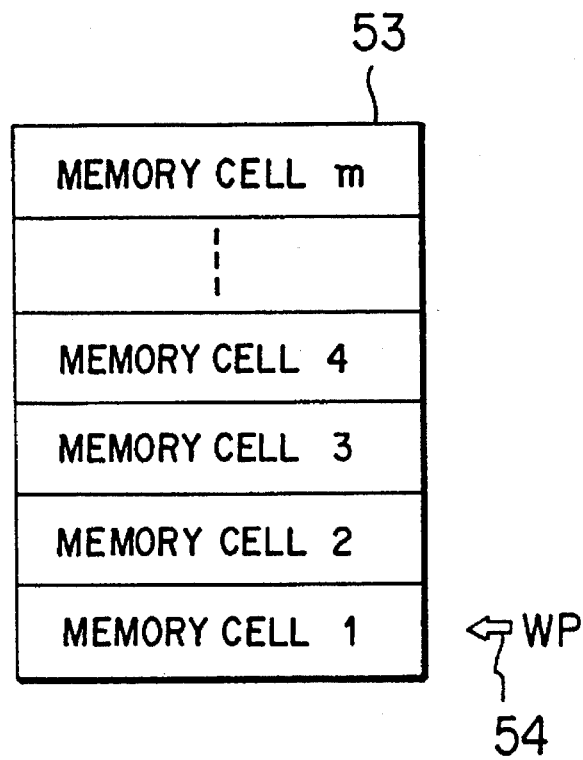
FIG. 15(a) is a drawing showing arrangement of memory cells in a memory array.
Figure 15B:
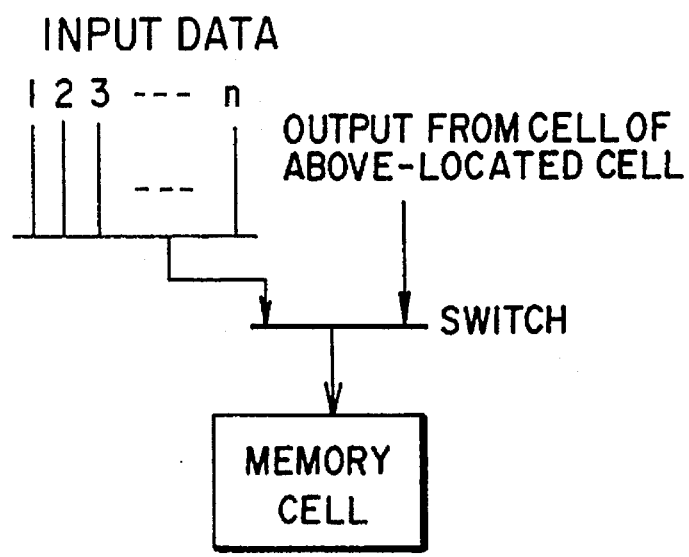
FIG. 15(b) is a drawing illustrating the input terminal of each memory cell.

First, as shown in FIG. 15(*a*), a memory array 53 consists of m rows×1 column of memory cells, each for inputting/outputting data one word at a time. As many words as variable-length data are written at a time into the memory array 53 upward in the figure starting at the row pointed to by a write pointer (WP) 54; data is always read out only the memory cell on the bottom row. For this reason, just after the read, each of the words stored in the memory cells is shifted to the memory cell of the just-below located row. Each memory cell has one input terminal for directly writing the corresponding word of input data at write operation and another for writing the word stored in the memory cell of the just-above row at read operation.

Returning to FIG. 14, a data analysis block 50 detects word count n stored in a header of input data having the format shown in FIG. 11. An arithmetic circuit 51 calculates a new write memory cell position of the memory array 53 to be pointed to by the write pointer after variable-length data is written into the memory array 53 as described below. A write pointer control block 52 is responsive to a write signal of a write instruction and a read signal of a read instruction for controlling the operation of the write pointer 54. The write pointer control block 52 also outputs a full flag signal and an empty flag signal as described below.

Figure 16:
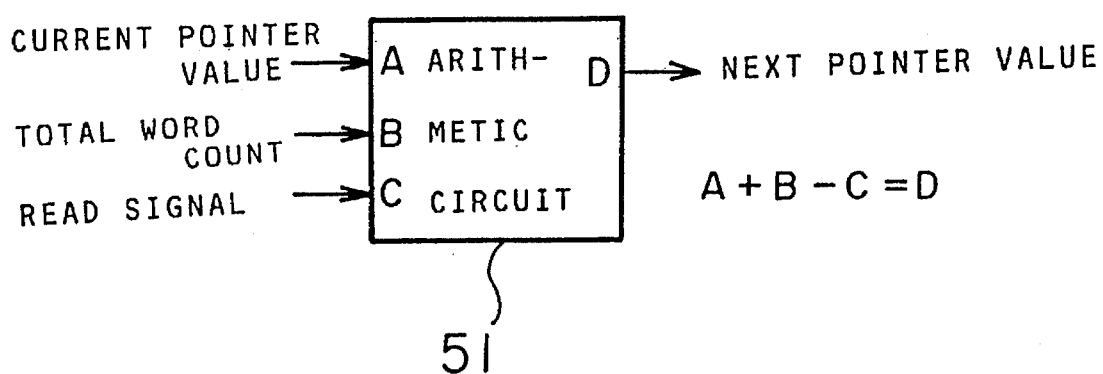
FIG. 16 is a drawing illustrating the operation of an arithmetic circuit.

FIG. 16 is an illustration of the operation of the arithmetic circuit 51. The value of the current row pointed to by the write pointer 54, A, the total word count of "word count n of input data detected by the data analysis block 50+1", B, and value set to 1 each time a read signal is input, C, are input to the arithmetic circuit which then calculates A+B−C and outputs the result D as a new memory cell position of the memory array 53 to be pointed to by the write pointer 54.

Next, the operation of the fifth embodiment is described.

Figure 17:
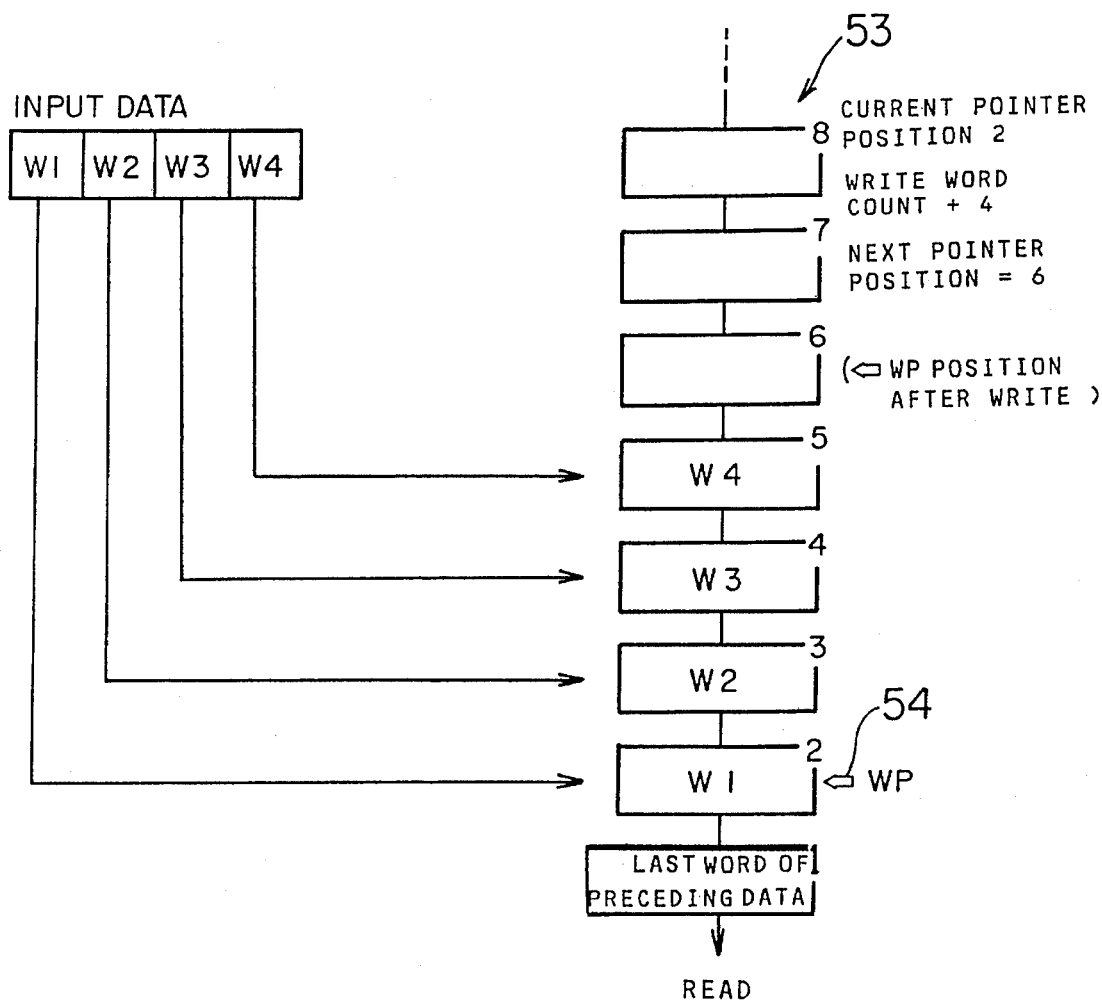
FIG. 17 is a drawing illustrating the operation of the arithmetic circuit in FIG. 16 when only a write is executed.

FIG. 17 shows an operation example of the arithmetic circuit 51 when a write only is executed. Assume that the write pointer 54, before the write is executed, points to memory cell 2 on the second row of the memory array 53 and that 4-word input data is input at the time. In this case, the input data is written into the second to fifth rows of the memory array 53 at a time, and the arithmetic circuit outputs "6". Thus, the next input data will be written into rows starting at the sixth row of the memory array 53.

Figure 18:
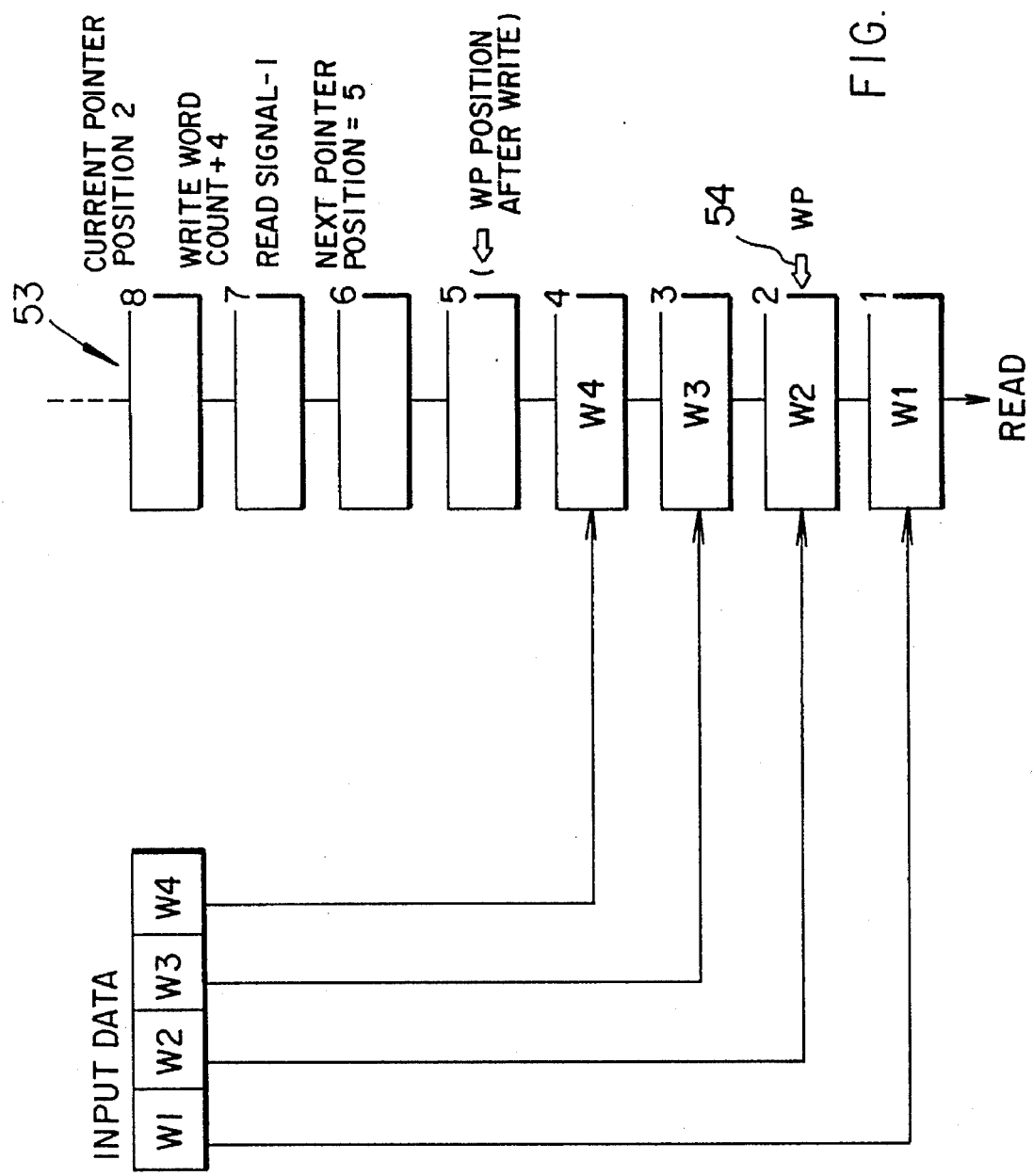
FIG. 18 is a drawing illustrating the operation of the arithmetic circuit in FIG. 16 when a write and read are executed.

FIG. 18 shows an operation example of the arithmetic circuit 51 when a write and read are executed. Assume that the write pointer 54, before the write is executed, points to memory cell 2 on the second row of the memory array 53 and that 4-word input data is input at the time. In this case, the input data is written into the second to fifth rows of the memory array 53 at a time, and one read is executed, then the arithmetic circuit outputs "5". Thus, the next input data will be written into rows starting at the fifth row of the memory array 53.

Even if input data is written at a time, the write start position of the next data to be input is always calculated by the arithmetic circuit 51 and is pointed to by the write pointer 54. Therefore, input data is written into the memory array 53 without any space, and only the original words of the data read out for each row is handled as words.

When the write pointer 54 points to memory cell 1 on the bottom row of the memory array 53, the write pointer control block 52 outputs an empty flag signal; when the number of memory cells from the current row of the memory array 53 pointed to by the write pointer to the top row is less than the word count of the next input data, the write pointer control block 52 outputs a full flag signal.

FIG. 19 is a drawing for illustrating specification values of the write pointer 54 when input data of p words in total is written into the memory array 53 consisting of m memory cells. The p-word input data is written into p memory cells starting at the memory cell having the number corresponding to the specification value of the write pointer 54.

If the specification value of the write pointer 54 exceeds (m−p+1), not all the p-word data can be written, thus a full flag signal is output.

The fourth and fifth embodiments can be used for data distributing circuits, etc., required for a three-dimensional graphics display to perform parallel processing for speeding up graphics processing.

Figure 20:
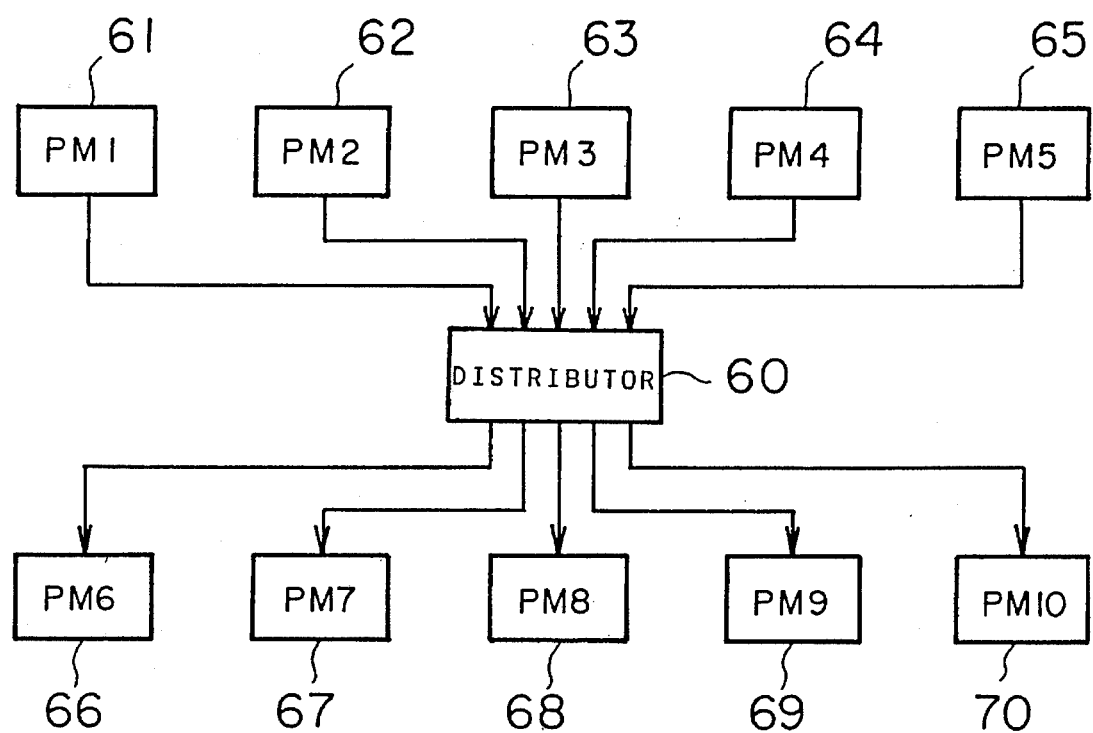
FIG. 20 is a block diagram showing a data distributing circuit using the fourth and fifth embodiments.

FIG. 20 is a block diagram showing a data distributing circuit using the fourth and fifth embodiments. Each of processor modules (PMs) 61–70 has a CPU and local memory and data calculated by the processor modules 61–65 is transferred via a distributor 60 to the processor modules 66–70 at the following stage.

Figure 21:
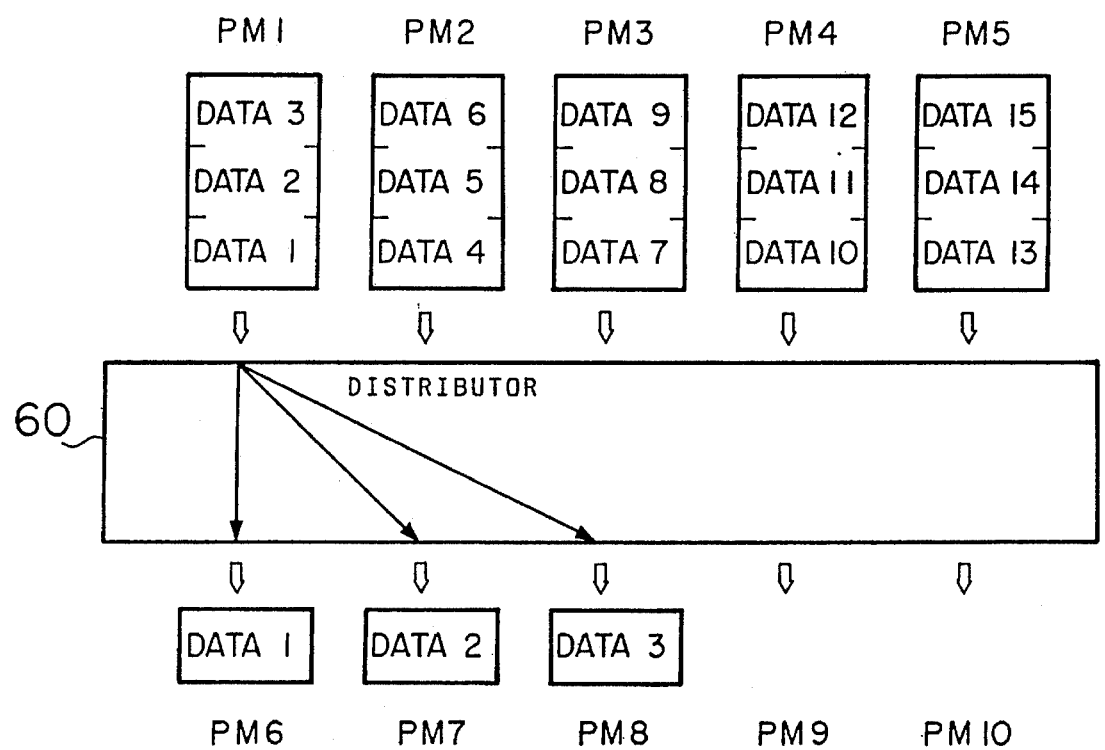
FIG. 21 is a drawing showing how data provided by processor module PM1 is distributed by a distributor.
Figure 22:
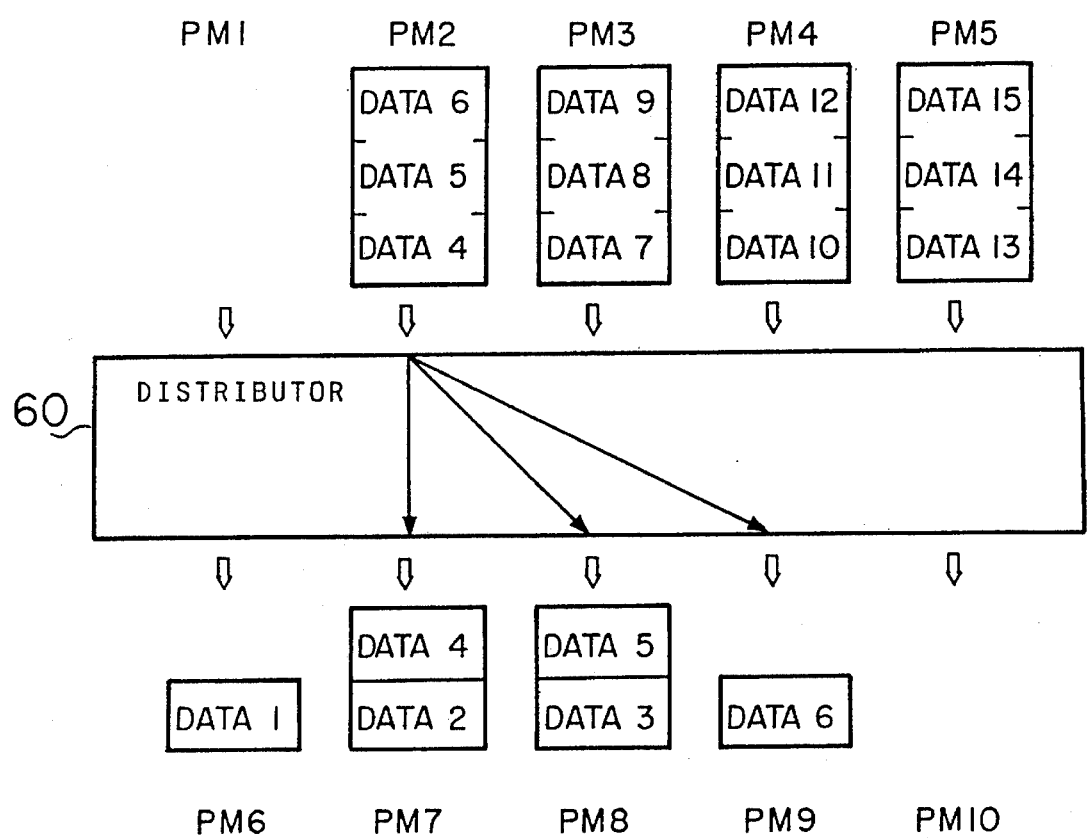
FIG. 22 is a drawing showing how data provided by processor module PM2 is distributed by a distributor.

Assume that data pieces provided by the processor module are distributed to the processor modules 66, 67, and 68, as shown in FIG. 21, and that data pieces provided by the processor module 62 are distributed to the processor modules 67, 68, and 69, as shown in FIG. 22.

At the time, if it is necessary to distribute data 2 before data 4 and data 3 before data 5 as shown in FIG. 22, such a processing sequence that distribution processing of output data from the processor module 61 should be performed before that from the processor module 62 is specified for the above-mentioned distribution operation; parallel processing of distribution cannot be performed.

Therefore, the processing speed of the distributor 60 requires the processing speed conforming to the number of installed processor modules, in this case, the speed five times as fast as that of each of the processor modules 61–65. To enable the processing speed, the fourth and fifth embodiments are effective.

The distributor 60 is provided with as many FIFO memory devices of the fourth embodiment and those of the fifth embodiment as the number of the processor modules 66–70. Data items output from the processor modules 61–65 are distributed in the distribution processing sequence for writing into the memory arrays of the fourth embodiment one word at a time. At the time, command data is added for each data item and data words are collected for each data item. After the distribution terminates, the words written into each memory array are read out at a time and are written into the memory arrays of the fifth embodiment. The data is read out from the memory arrays of the fifth embodiment one word at a time and are output to the processor modules 66–70 as one data item for each command data piece.

Distributed data is stored in the FIFO memory devices of the fourth embodiment in sequence for transfer to the FIFO memory devices of the fifth embodiment where the data is disassembled into data items for passing to the processor modules 66–70 at the following stage, thereby speeding up the processing speed of the distributor.

Next, there is shown an embodiment of a synchronizing circuit using an FIFO memory device where data is input and output one bit at a time.

Figure 1:
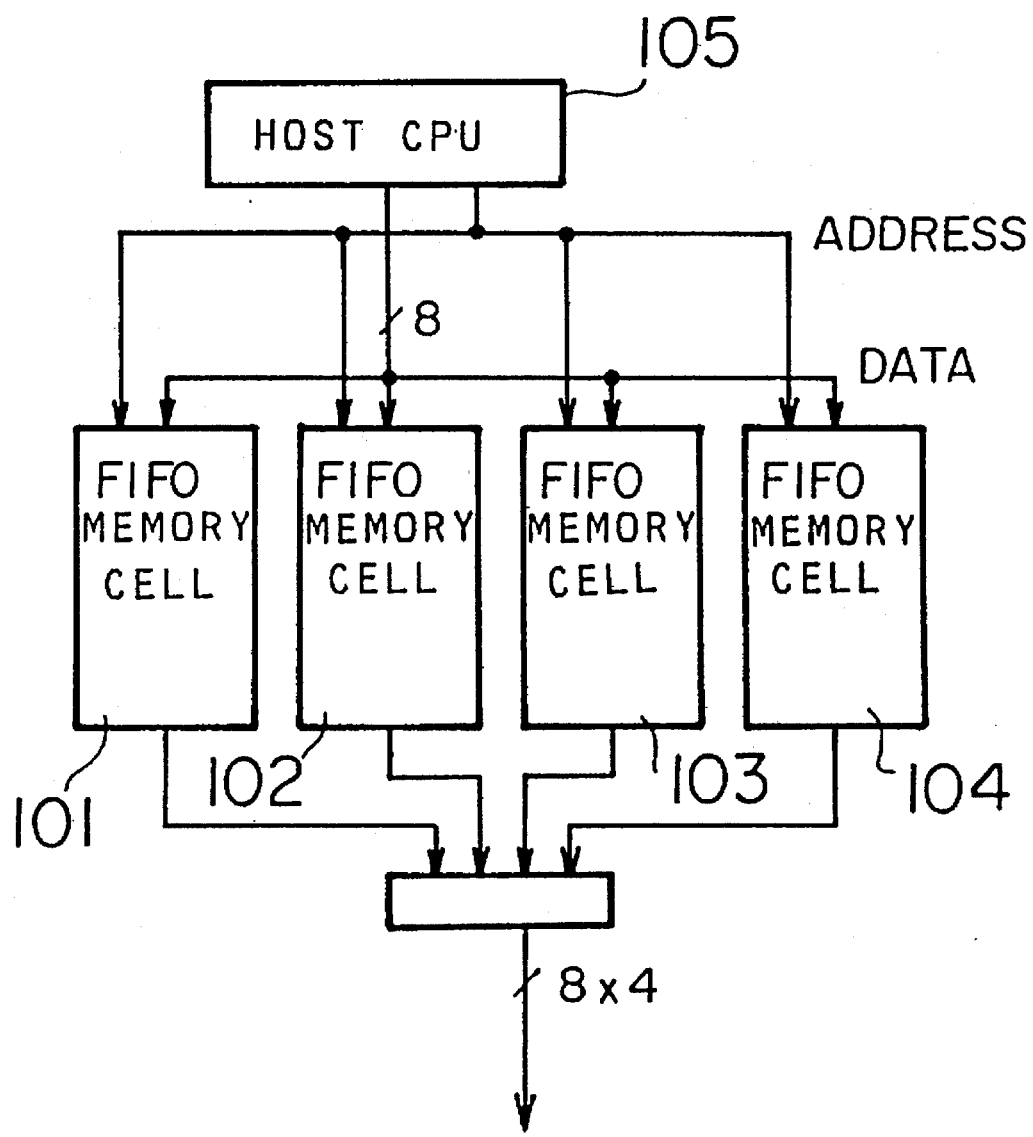
FIG. 1 is a block diagram showing a conventional FIFO memory device where fixed-length data is input one word at a time and one data item consisting of words is output in parallel at the same time.
Figure 2A:
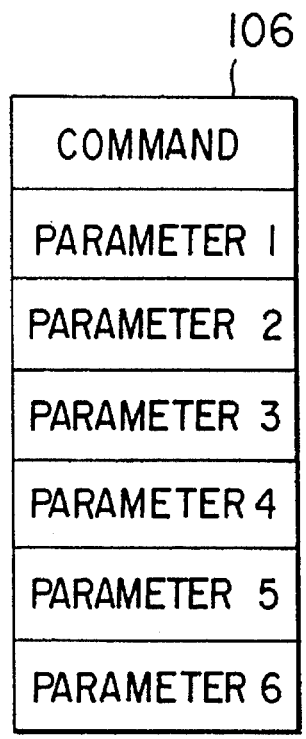
FIG. 2(a) is a drawing showing the word configuration of input data.
Figure 2B:
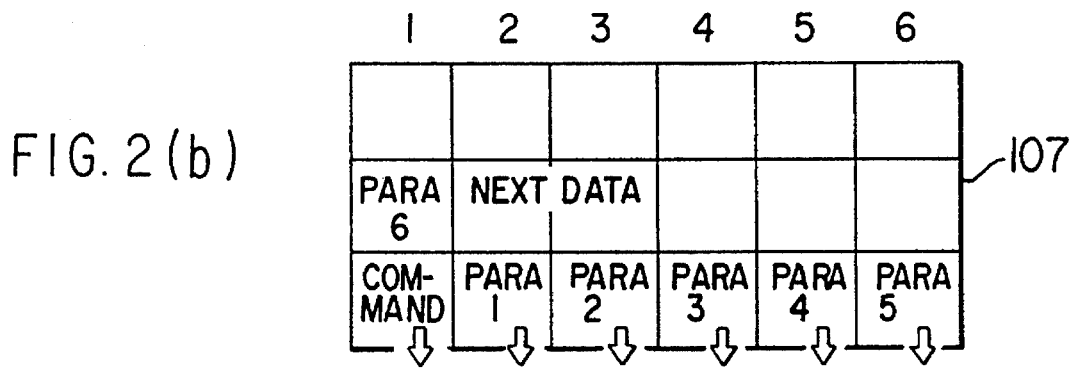
FIG. 2(b) is a drawing illustrating conventional data write.
Figure 2C:
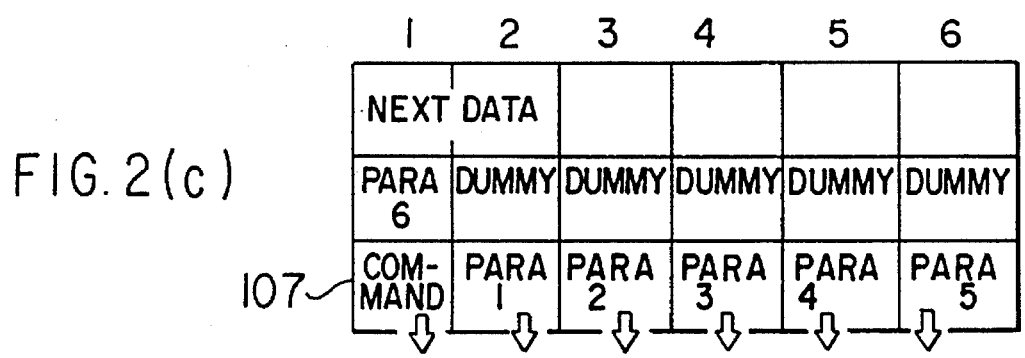
FIG. 2(c) is a drawing illustrating conventional dummy data write.
Figure 3:
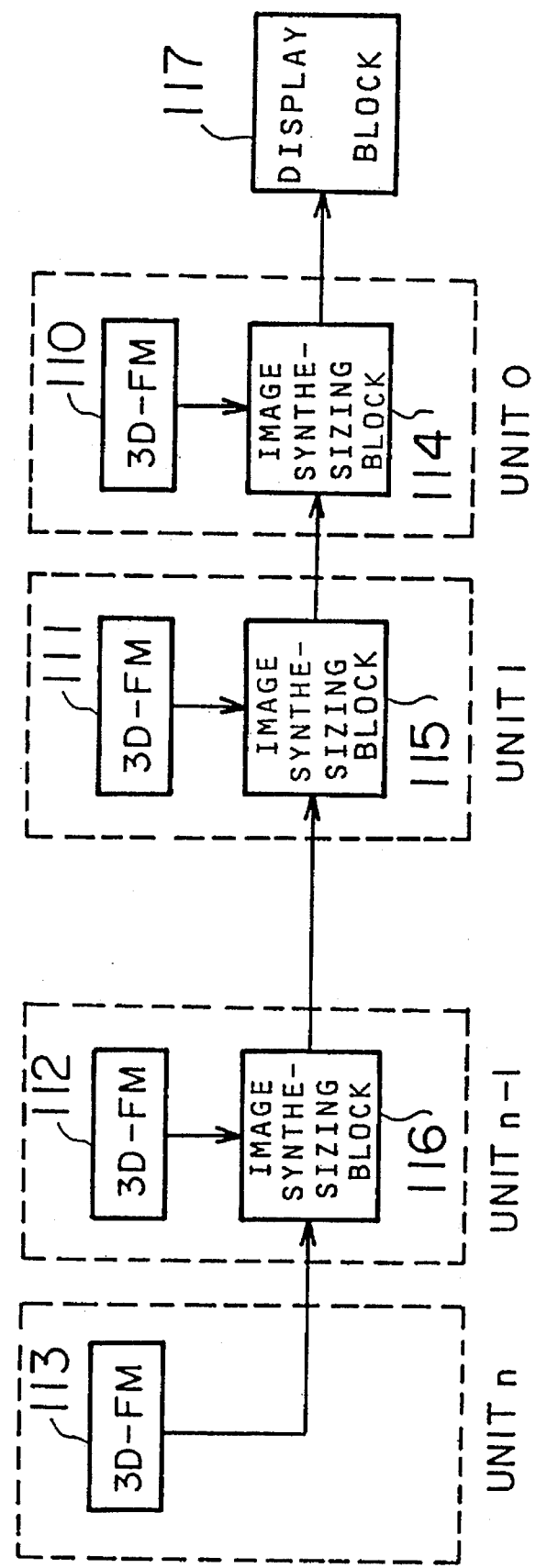
FIG. 3 is a block diagram showing an outline of a conventional three-dimensional graphics display.
Figure 23:
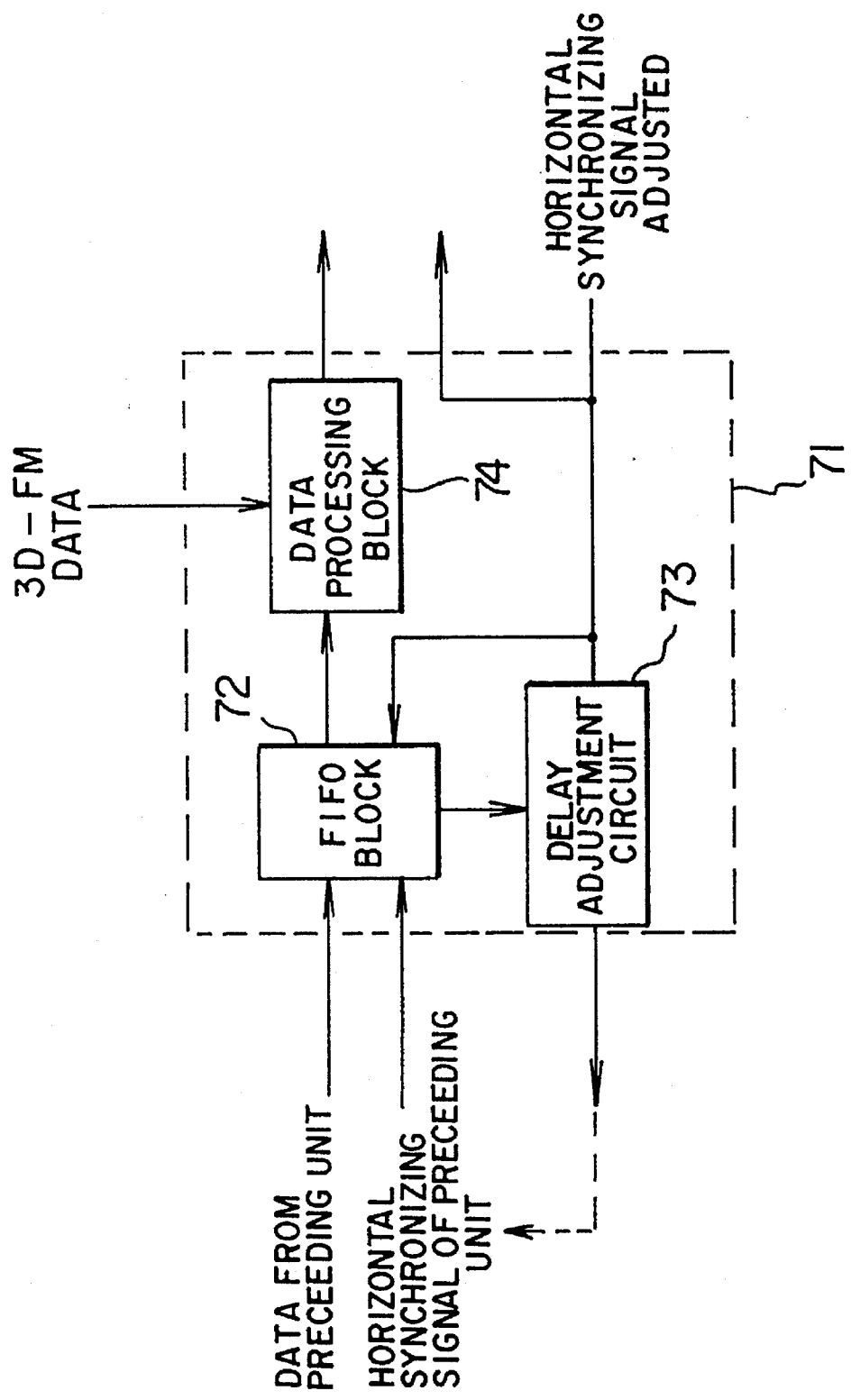
FIG. 23 is a block diagram showing the internal configuration of an image synthesizing circuit used with a three-dimensional graphics display.

FIG. 23 shows an image synthesizing circuit 71 used with a three-dimensional graphics display. The image synthesizing circuit 71 corresponds to the image synthesizing block 114, 115, or 116 shown in FIG. 3.

The image synthesizing circuit 71 which is a unit at its own stage is made up of an FIFO block 72 for timing adjustment of input data, a delay adjustment circuit 73 for correcting timing fluctuation occurring at the FIFO block 2, and a data processing block 74 for synthesizing 3D-FM data at its own unit with data from the unit at the preceding stage. The FIFO block 72 writes data input from the preceding unit one bit at a time in synchronization with a horizontal synchronizing signal from the preceding unit, and outputs the data one bit at a time in the write order in synchronization with a horizontal synchronizing signal of its own unit. The horizontal synchronizing signal of its own unit is sent as a horizontal synchronizing signal of its own unit from the unit at the following stage. The delay adjustment circuit 73 sends a horizontal synchronizing signal adjusted so that the data write timing by the FIFO block 72 is delayed as long as the given time from the read timing to the preceding unit as a horizontal synchronizing signal of the preceding unit.

Figure 24:
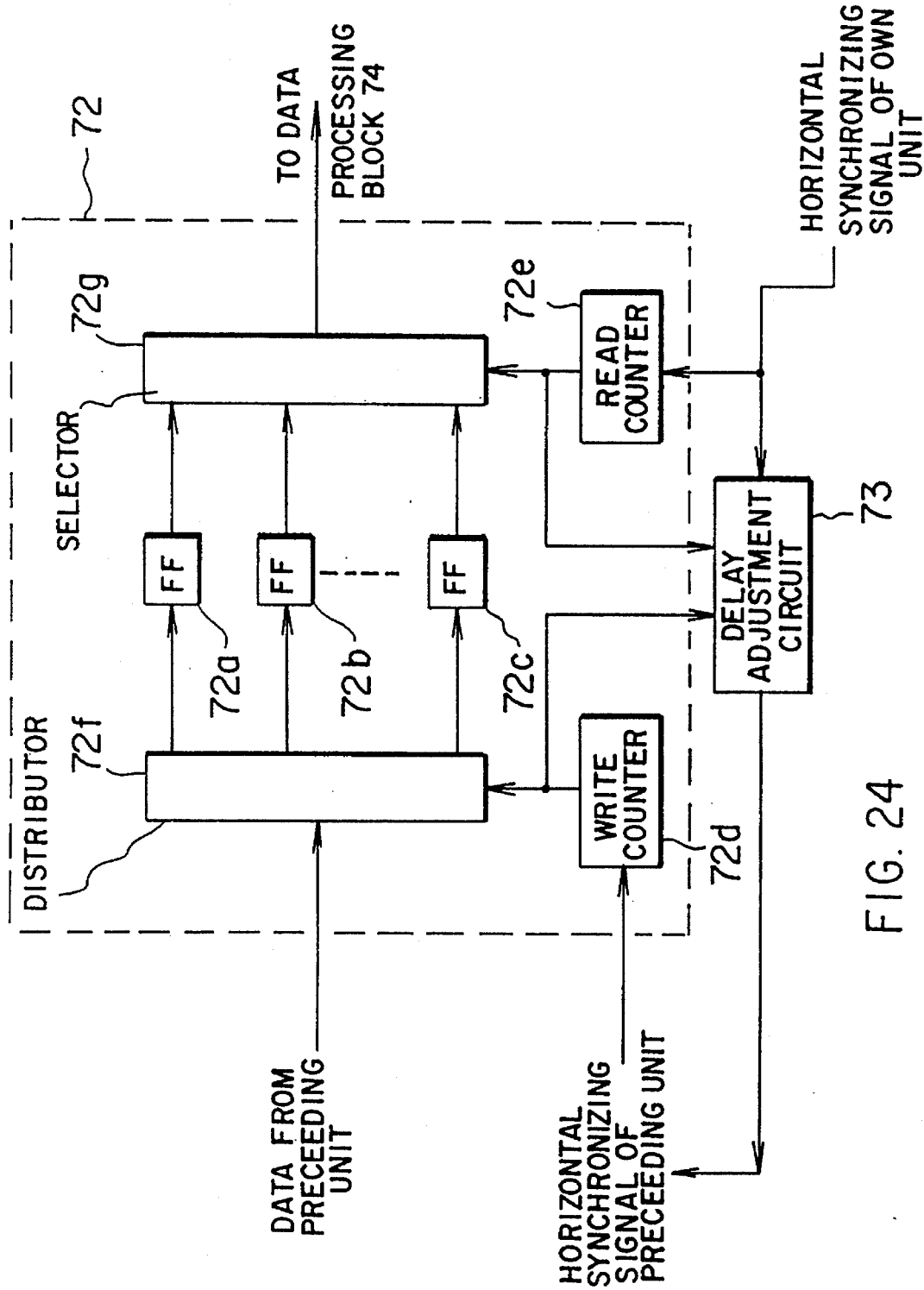
FIG. 24 is a block diagram showing the internal configuration of the FIFO block shown in FIG. 23.

FIG. 24 is a block diagram showing the internal configuration of the FIFO block 72 in FIG. 23. Each of registers 72a–72c is made up of a flip-flop for storing 1-bit data. A write counter 72d specifies one of the registers 72a–72c into which input bit data is to be written. A read counter 72e specifies one of the registers 72a–72c frown which data is to be read out. The registers 72a–72c are previously assigned 0 to "number of installed registers of 72a–72c −1"", and the write counter 72d and the read counter 72e specify the digit or digits corresponding to the number as a count value. A distributor 72f sends bit data from the preceding unit to the register specified by the write counter 72d. A selector 72g reads bit data from the register specified by the read counter 72e and outputs it to the data processing block 74.

After receiving a horizontal synchronizing signal from the preceding unit, the write counter 72d starts counting up in response to a system clock signal synchronized with input bit data. When the count value reaches the "number of installed registers of 72a–72c −1", the count value is reset to 0. After receiving a horizontal synchronizing signal of its own unit, the read counter 72e starts counting up in response to a system clock signal synchronized with input bit data. When the count value reaches the "number of installed registers of 72a–72c −1", the count value is reset to 0.

Count values are input from the write counter 72d and the read counter 72e to the delay adjustment circuit 73. When the count value of the read counter 72e is 0, the delay adjustment circuit 73 reads the count value of the write counter 72d. If the count value of the write counter 72d is greater than a half of the maximum value of the count (the number of installed registers of 72a–72c −1), the delay adjustment circuit 73 delays a horizontal synchronizing signal of its own unit by one clock of the system clock signal for output to the preceding unit as a horizontal synchronizing signal of the preceding unit. If the former is less than the latter, the delay adjustment circuit 73 sets a horizontal synchronizing signal of its own unit ahead by one clock of the system clock signal for output the preceding unit as a horizontal synchronizing signal of the preceding unit. If they equal, no change is made.

An operation example of the delay adjustment circuit 73 when the number of installed registers 72a–72c is five is given in conjunction with FIG. 25. In FIG. 25(a), when the count value of the read counter 72e is 0, the count value of the write counter 72d is 3. The value 3 is greater than a half of the maximum value of the count 4 (5–1), namely, 2. Therefore, the delay adjustment circuit 73 delays a horizontal synchronizing signal of its own unit by one clock of the system clock signal for output to the preceding unit. The next horizontal synchronizing signal sent from the preceding unit becomes a signal delayed by two clocks of the system clock signal (a half of the maximum value of the count) as compared with the horizontal synchronizing signal of its own unit, as shown in the right of the figure.

In FIG. 25(b), when the count value of the read counter 72e is 0, the count value of the write counter 72d is 1 which is less than a half of the maximum value of the count, 2. Therefore, the delay adjustment circuit 73 sets a horizontal synchronizing signal of its own unit ahead by one clock of the system clock signal for output to the preceding unit. The next horizontal synchronizing signal sent from the preceding unit also becomes a signal delayed by two clocks of the system clock signal (a half of the maximum value of the count) as compared with the horizontal synchronizing signal of its own unit, as shown in the right of the figure.

In both FIGS. 25(a) and (b), when the next horizontal synchronizing signal is input, the timing is corrected. After this, when the count value of the read counter 72e is 0, the count value of the write counter 72d is held 2. Thus, even if synchronization shift is caused by a temperature change or parts variation, input data can always be output with an accurate delay as long as two clocks of a system clock signal synchronized with input bit data. Since adjustment is made as described above, even when a large number of units are connected to build a system, synchronization need not be adjusted at each connection.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be restored to, falling within the scope of the invention in the appended claims and their equivalents.

What is claimed is:

1. A FIFO memory device for storing variable-length data which contains a plurality of words and a word count thereof, said FIFO memory device comprising:

storage means containing a plurality of storage unit cells arranged as a matrix which can be specified by a two-dimensional coordinate address, wherein each of the storage unit cells can be read or written one word at a time;

word count detection means, coupled to a data input port of said storage means in parallel, for detecting the word count contained in the variable-length data to be input to said storage means;

write cell specification means, coupled to said storage means, for specifying one of the storage unit cells in said storage means by the two-dimensional coordinate address so that the variable-length data is written to one of rows of said storage means from a beginning thereof until the number of the words written thereto reaches the word count detected by said word count detection means; and read cell specification means, coupled to said storage means, for specifying one of the rows of said storage means to read out in a first-in first-out manner.

2. A FIFO memory device for storing variable-length data which contains a plurality of words and a word count thereof, said FIFO memory device comprising:

storage means containing a plurality of storage unit cells arranged as a unidimensional array, at a bottom of which an output port is provided to read out contents therein, wherein each of said storage unit cells can be read or written one word at a time;

word count detection means, coupled to a data input port of said storage means in parallel, for detecting the word count contained in the variable-length data to be input as input data to said storage means;

row specification means, coupled to said word count detection means and said storage means, for specifying a row address to point at a row of said storage means into which an initial word of the input data is to be written, wherein the row address is updated after a data write operation to said storage means according to the word count previously detected by said word count detection means;

write means, coupled to said storage means, for performing the data write operation which writes the input data in batch to a portion of said storage means starting from the row specified by said row specification means;

read means, coupled to the output port of said storage means, for reading out the contents of said storage means from the output port in a word-by-word manner; and row shift means for shifting the contents in said storage means by one row forward to the output port each time after said read means reads out one word.

3. A distributor for distributing variable-length data which contains a plurality of words and a word count thereof to a plurality of devices, said distributor comprising:

first storage means containing a plurality of storage unit cells arranged as a matrix which can be specified by a two-dimensional coordinate address, wherein each of the storage unit cells can be read or written one word at a time;

first word count detection means, coupled to a first data input port of said first storage means in parallel, for detecting a first word count contained in the variable-length data to be input to said first storage means;

write cell specification means, coupled to said first storage means, for specifying one of the storage unit cells in said first storage means by the two-dimensional coordinate address so that the variable-length data is written to one of rows of said first storage means from a beginning thereof until the number of the words written thereto reaches the first word count detected by said first word count detection means;

read cell specification means, coupled to said first storage means, for specifying one of the rows of said first storage means to read out in a first-in first-out manner;

second storage means, coupled at a second data input port thereof to an output of said first storage means, containing another set of the storage unit cells arranged as a unidimensional array, at a bottom of which an output port is provided to read out contents therein, wherein each of the storage unit cells can be read or written one word at a time;

second word count detection means, coupled to the second data input port of said second storage means in parallel, for detecting a second word count contained in a read-out data which is read out from said first storage means and present at the second data input port of said second storage means;

row specification means, coupled to said second word count detection means and said second storage means, for specifying a row address to point at a row of said second storage means into which an initial word of the read-out data is to be written, wherein the row address is updated after a data write operation to said second storage means, according to the second word count previously detected by said second word count detection means;

write means, coupled to said second storage means, for performing the data write operation which writes the read-out data in batch to a portion of said second storage means starting at the row specified by said row specification means;

read means, coupled to the output port of said second storage means, for reading out the contents of said second storage means from the output port in a word-by-word manner; and row shift means for shifting the contents in said second storage means by one row forward to the output port each time after said read means reads out one word.

* * * * *